United States Patent
Chopard et al.

(10) Patent No.: US 8,378,890 B2
(45) Date of Patent: Feb. 19, 2013

(54) SATELLITE-BASED POSITIONING RECEIVER

(75) Inventors: Vincent Chopard, Tournon sur Rhone (FR); Nicolas Martin, Bourg les Valence (FR)

(73) Assignee: Thales, Neuilly sur Seine (FR)

( * ) Notice: Subject to any disclaimer, the term of this patent is extended or adjusted under 35 U.S.C. 154(b) by 181 days.

(21) Appl. No.: 12/969,904

(22) Filed: Dec. 16, 2010

(65) Prior Publication Data

US 2011/0181463 A1  Jul. 28, 2011

(30) Foreign Application Priority Data

Dec. 18, 2009  (FR) .................................... 09 06182

(51) Int. Cl.
  *G01S 19/35* (2010.01)
  *G01S 19/29* (2010.01)
  *G01S 19/30* (2010.01)
(52) U.S. Cl. .......... 342/357.75; 342/357.68; 342/357.69
(58) Field of Classification Search ............. 342/357.26, 342/357.46, 357.68, 357.69, 357.75; 701/468, 701/469
See application file for complete search history.

(56) References Cited

U.S. PATENT DOCUMENTS

| | | | |
|---|---|---|---|
| 5,983,160 A | 11/1999 | Horslund et al. | |
| 6,516,021 B1 | 2/2003 | Abbott et al. | |
| 6,873,288 B2 | 3/2005 | Heppe | |
| 2006/0074558 A1* | 4/2006 | Williamson et al. | 701/213 |
| 2011/0169689 A1* | 7/2011 | Wang et al. | 342/357.3 |

FOREIGN PATENT DOCUMENTS

FR  2881008  7/2006

OTHER PUBLICATIONS

Lashley, et al., "Performance Analysis of Vector Tracking Algorithms for Weak GPS Signals in High Dynamics," IEEE J. of Select. Topics in Signal Processing, vol. 3, No. 4, pp. 661-673 (Aug. 1, 2009).
Petovello, et al., "Comparison of Vector-Based Software Receiver Implementations with Application to Ultra-Tight GPS/INS Integration," ION GNSS, 19th Int'l Tech. Mtg. of Satellite Div., pp. 1790-1799 (Sep. 29, 2006).
Ford, et al., "NovaAtel Inc. New Positioning Filter: Phase Smoothing in the Position Domain," ION GPS, pp. 1860-1862 (Sep. 27, 2002).
Pany, et al., "Use of a Vector Delay Lock Loop Receiver for GNSS Signal Power Analysis in Bad Signal Conditions," Pos., Loc. and Nav. Symposium 2006 IEEE, pp. 893-903 (Apr. 25, 2006).
J.J. Spilker Jr., et al. "Global Positioning System: Theory and Applications," vol. I, Chapter 7 ("Fundamentals of Signal Tracking Theory"), American Institute of Aeronautics and Astronautics, Inc., 1994, pp. 245-327.

* cited by examiner

*Primary Examiner* — Dao Phan
(74) *Attorney, Agent, or Firm* — Baker & Hostetler LLP

(57) ABSTRACT

A satellite-based positioning receiver includes processing channels, each processing channel being associated with a respective satellite from among N satellites, and an extended Kalman filter for performing a vector tracking for the set of satellites using signals received from the satellites. The extended Kalman filter performs a resetting on the basis of the phase error and code error received directly from the phase and code discriminators, of each channel, and the receiver is configured for calculating the code-wise and carrier-wise control signals for the code phase and carrier phase numerically-controlled oscillators, on the basis of data provided by the extended Kalman filter, for each channel.

12 Claims, 12 Drawing Sheets

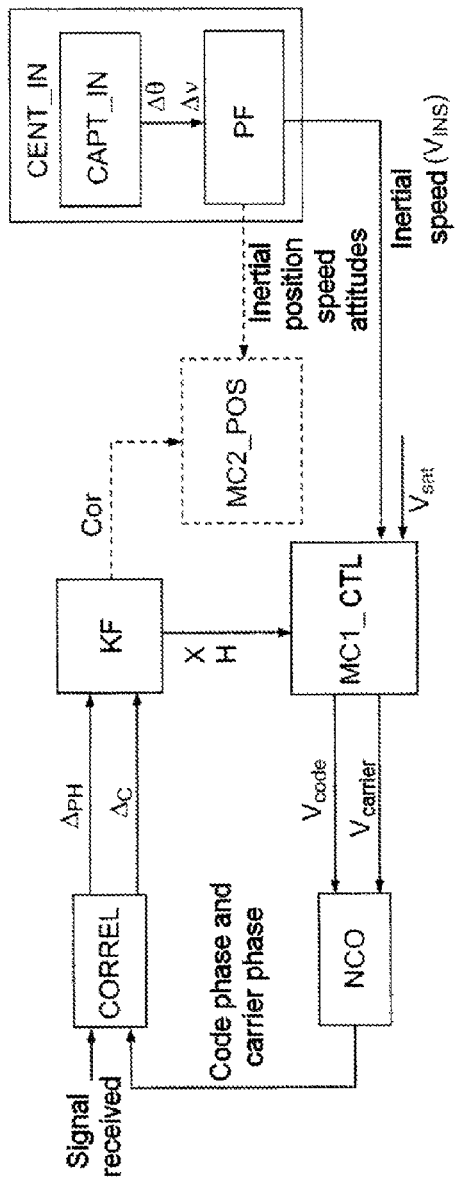
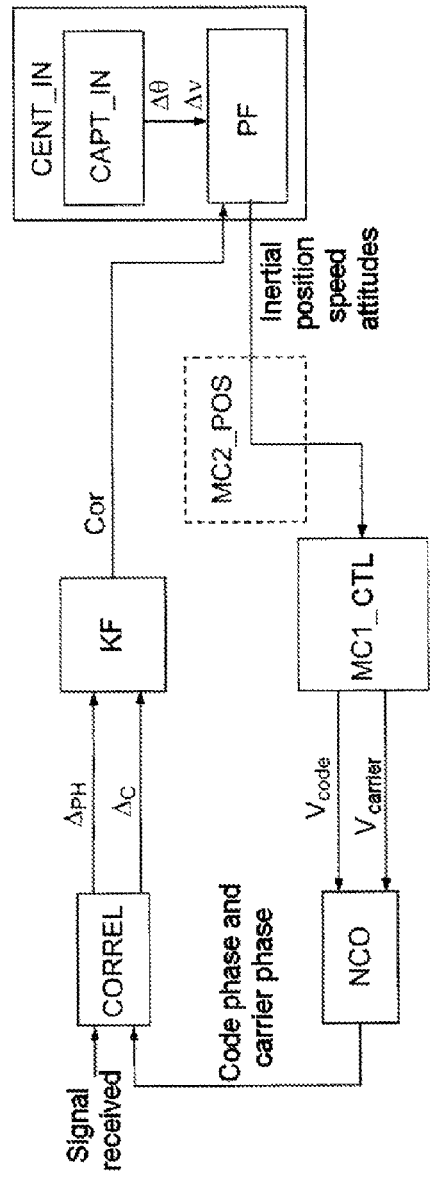
FIG.9
FIG.10

SATELLITE-BASED POSITIONING RECEIVER

CROSS-REFERENCE TO RELATED APPLICATION

This application claims priority to foreign French patent application No. FR 09 06182, filed on Dec. 18, 2009, the disclosure of which is incorporated by reference in its entirety

FIELD OF THE INVENTION

The invention relates to a signal receiver for a satellite-based radionavigation system intended to calculate the position of a carrier very precisely. The best known system, which will be referred to hereinafter, is the GPS system, and satellite-based radionavigation systems will be designated under the generic term GPS even if they are similar systems such as Galileo or Glonass.

BACKGROUND OF THE INVENTION

The GPS system uses a constellation of satellites which rotate about the earth in very precisely determined orbits, that is to say the position of an arbitrary satellite can be ascertained at any instant. The orbits of the satellites are chosen in such a way that at any time, 6 to 12 satellites are visible at any point of the earth. Each satellite transmits two radioelectric signals of frequencies $L_1$ (1575.42 MHz) and $L_2$ (1227.6 MHz). On the ground or on a vehicle on land or sea or in the air, a GPS receiver receives the signals transmitted by visible satellites.

The onboard GPS receiver measures the duration of propagation required in order for a time mark transmitted by a satellite to reach it. The time marks are coded on carrier waves by the phase modulation technique. Each satellite thus transmits its own pseudo-random code. A replica of the sequence of the code is generated by the receiver and the shift that the replica must undergo so as to coincide with the code received corresponds to the duration of propagation of the signal in order to travel the satellite-receiver distance. This duration multiplied by the speed of light in the medium traversed gives a distance measurement called a pseudo-distance. On the basis of the measurements of the pseudo-distances separating it from each visible satellite, and of the knowledge of the position of the satellites, the receiver deduces its precise position in latitude, longitude, and in altitude in a terrestrial reference frame by a numerical resolution procedure akin to triangulation. It can also deduce therefrom the date and the precise time in the temporal reference frame of the GPS system.

The time reference of the receiver, provided by its clock, does not coincide perfectly with the time reference of the satellites of the constellation; this induces a bias in the measurements of propagation time, therefore of distance, that is equal to the delay of the time reference of the receiver with respect to the time reference of the satellites. The term "pseudo-distance" is employed for this purpose. The time bias, common to all the measurements, constitutes a fourth unknown, in addition to the three position unknowns, and this makes it necessary to have at least four measurements to calculate the position.

Furthermore, the position of the receiver is estimated by making a certain number of approximations. The measurement of the pseudo-distance cannot for example circumvent the system-related errors such as the lack of precision of the ephemerides or clocks onboard the satellites. The measurement of the pseudo-distance is also marred by errors related to the interactions between the signals and the atmospheric layers that they pass through. The signal propagation delay in the troposphere and the ionosphere depends on the inclination of the path and the time at which it takes place. Typically, GPS positioning errors related to the atmosphere are more marked by day than at night and more sensitive when a satellite is close to the horizon than the zenith. In certain applications such as for example a precision approach in aeronautics, the positioning precision obtained by a direct (or absolute) measurement of the pseudo-distance is not sufficient.

The use of a differential measurement makes it possible to substantially improve the precision of the positioning. It consists in transmitting, via a dedicated channel (VHF, UHF or cellular telephony), corrections of the pseudo-distance measurements formulated on the basis of pseudo-distance measurements originating from receivers disposed in ground stations and whose positions are very precisely known and close to the onboard receiver. The measurement of the pseudo-distance separating a ground receiver and a satellite is compared with the theoretical distance separating these two devices. The theoretical distance is calculated on the basis of the respective spatial coordinates of the ground receiver and of the satellite which are known at any instant. The difference between the distance measurement and the theoretical distance represents the measurement error; it is calculated for each satellite at each observation epoch. These distance differences constitute corrective terms (also called differential corrections) which are deducted from the pseudo-distance measurements carried out by the mobile receiver. These corrections have the effect of almost totally removing the errors which exhibit a significant spatial correlation whatever their origin, system or atmospheric. The corrections are all the more effective the closer the two receivers. However, the differential measurement does not eliminate the errors related to the reflections of the signal on objects that are close to the antenna of the receiver, nor the errors specific to the receiver (thermal noise). These errors are present in the reference receiver as well as in the onboard receiver, they degrade the positioning measurement during differential correction; the precision obtained is of the order of a few metres.

To improve the positioning precision, the ground receivers and carrier-borne mobile receivers can also exploit a second item of information formulated by the receiver which is the measurement of the phase of the carrier, for each satellite signal received. The measurement of the instantaneous phase of the carrier received actually makes it possible to calculate a pseudo-distance, termed the carrier pseudo-distance, between the receiver and the satellite, in the same way as the measurement of the instantaneous phase of the pseudo-random code. This carrier pseudo-distance undergoes the same variations as the code pseudo-distance, when the distance between the receiver and the satellite or the time bias due to the clock of the receiver vary. This pseudo-distance measured by the phase is a priori ambiguous since the phase is known modulo $2\pi$ but it is much less noisy than the code pseudo-distance measurements.

A known solution for improving pseudo-distance measurements consists in smoothing the noisy pseudo-distance measurement carried out on the code by the not very noisy phase measurements. For this purpose the receiver applies a low-pass filter to the difference between the code pseudo-distance and carrier pseudo-distance measurements, then adds this filtered difference to the carrier pseudo-distance measurement so as to reconstitute the code phase measurement. This processing is carried out satellite axis by satellite axis. If the measurement is differential, an identical smoothing is applied to the receivers of the ground station so that the tracking error of the low-pass filter, due to the divergence between the code and the carrier related to the fluctuations in the ionospheric delay, is identical on the ground and in the mobile receiver, and does not disturb the positioning measurement after application of the correction.

The main benefit of the axis-by-axis smoothing process lies in its simplicity and in the absence of any coupling effect between the measurements of the pseudo-distances of the various satellites or channels, nonetheless it is not completely satisfactory. Indeed, the gain in the precision of the measurement is important only when the smoothing is performed with a long time constant; and in this case, the duration of reinitialization to recover the precision after an abrupt modification of the set of available measurements is also long, for example upon the disappearance of a satellite by masking, upon a fault with a satellite or else upon a fault with a ground receiver in the case of differential GPS. It would be desirable to avoid this drawback.

Moreover, to quantify the integrity of the position measurement in applications where integrity is critical, such as aeronautical applications, a parameter called the position measurement "protection radius" is used. The protection radius corresponds to a maximum position error for a given probability of an error occurring. That is to say, the probability that the position error exceeds the stipulated protection radius without being warned thereof is less than this given probability value. The calculation is based on two types of error which are on the one hand normal measurement errors and on the other hand errors caused by an operating anomaly in the constellation of satellites, by a failure of a satellite or else a failure of a ground receiver.

Commonly, two undesirable types of events that may arise with a GPS positioning system may be distinguished: the first, dubbed non-continuity, corresponds to an unplanned but declared degradation in the service; the second, called non-integrity, corresponds to an erroneous but undeclared position measurement, whose appearance is that of a reliable measurement. A non-continuity can correspond for example to the occurrence of an alarm indicating the supposed presence of a failure. In both cases the consequences can be serious, hence the necessity to minimize the probability of such events. A protection radius calculation can be estimated for a non-continuity probability value and a non-integrity probability value that are given a priori. In this case the probability that the positioning error exceeds the radius will be less than the given non-integrity probability, and the probability of alarm (justified or unjustified) will be less than the given non-continuity probability.

For example, in the case of existing systems which are based on smoothing, axis by axis, the pseudo-random code position measurements by the phase variations of the carrier, the protection radius degrades abruptly as a satellite disappears and takes a long time to regain an acceptable value after the satellite reappears, because of the response time of the smoothing filter. It would be desirable to find a solution which avoids this drawback.

The system described in European patent EP 1 839 070 alleviates the drawbacks of the solutions presented hereinabove. Its aim is to improve the precision of the position measurement by using in a novel manner the two simultaneous measurements of pseudo-distances made available by each satellite while according the position thus obtained better robustness in relation to strong degradations of the geometry of the satellites (transient regime) that it is liable to encounter, doing so both for the absolute positioning and for the differential positioning.

Such a system implements scalar tracking, which consists in tracking the satellites independently of one another. In this conventional configuration, to synchronize the local code and the local carrier on the signal received from the satellite, the receiver uses two tracking devices in parallel: a code loop and a carrier loop.

The term tracking represents the capacity to synchronize with the satellite signals by using, through feedback, the phase discrepancies between the receiver signal and the satellite signals.

The code loop serves to position a local code in phase with the code contained in the signal received from a satellite, so as to carry out a correlation giving the maximum energy. The carrier loop serves to slave the frequency or the phase of the local carrier with that of the carrier received, so as also to maximize the result of the correlation.

The presence of a signal at the output of the correlation having a significant amplitude, i.e. markedly greater than would be given by the ambient noise in the absence of any satellite signal, signifies that the local code and the local carrier are synchronized with the signal received, thereby making it possible to measure at each instant the date of emission of the signal received, by way of the phase of the local code and of the phase of the local carrier.

The initial synchronization of the phase of the local code and of the local carrier on the signal received from the satellite is carried out in a preliminary so-called acquisition step. This step is not detailed here since it is outside the scope of the patent, and is known to the person skilled in the art. To summarize, it consists of an energy search by scanning a code-wise and Doppler-wise uncertainty domain until the correlation gives a sufficient signal level.

The code loop uses at least two correlation pathways, with a local code leading and a local code lagging with respect to the reference code of the punctual pathway, and the same carrier for the three pathways. The loop seeks to equalize the levels at the output of the two correlation pathways through feedback on the phase of the local code by virtue of:

a code discriminator which measures the energy difference between the two pathways, a loop corrector which filters the output of the code discriminator and produces a speed correction, and a code numerically-controlled oscillator or NCO which transforms the speed control into a local code phase.

When the two levels are equal the reference code of the punctual pathway is in phase with the code of the satellite received, thereby ensuring maximum efficiency of the correlation on this pathway, except for the loss due to the Doppler effect.

There are two types of carrier loop: frequency loops and carrier phase loops.

A frequency loop serves to make the frequency of the local carrier coincide with that of the carrier received, firstly so as to maximize the signal gathered after correlation and secondly to provide a Doppler measurement on the tracked satellite. A phase loop serves to slave the phase of the local carrier to the phase of the carrier received (modulo $2\pi$).

A phase loop provides much richer information than a frequency loop, since the evolutions of the measured carrier phase convey very precisely the evolutions of the pseudo-distances, without drift, in contradistinction to the measurements of an integrated frequency loop.

Scalar tracking is unlike vector tracking which, on the basis of the measurements made on each signal at the output of the correlation pathways, directly estimates the position and the speed of the receiver which then serve for closing the slaving loop by feeding the numerically-controlled oscillators the carrier phase and the code phase of each signal. Thus, the tracking of the satellites is done in a centralized manner at the level of the final navigation calculation affording better robustness to jamming. This allows the tracking of the signals at more significant interference levels, especially when the navigation calculation module is coupled with an inertial centre.

There are several types of vector trackings.

In "Fundamentals of Signal Tracking Theory" (Spilker), the tracking of the signals is done by extending the scalar code loop named DLL (Delay Lock loop) into a vector loop. The carrier loop is demodulated by virtue of a speed aid ("Code Only" tracking). Therefore, no benefit is derived from the information regarding the measurement of the carrier phase. In the conventional GPS navigation architecture coupled with an inertial centre, the phase is controlled from the navigation calculation module in the case of heavy jamming ("code only" configuration). It is the code loop which is independent and slaved satellite by satellite.

Other documents, such as "Comparison of Vector-Based Software receiver implementations with Application to Ultra-Tight GPS/INS Integration" (Petovello, Lachapelle), "Enhanced GPS receiver utilizing vector tracking, fast correlation processing and multiple signal characterization" (Heppe), and "Global positioning system and inertial measuring systems unit ultra-tight coupling" (Abbott), use the Doppler for the navigation calculation. The slaving of the carrier is then done by the Doppler (as opposed to the phase).

SUMMARY OF THE INVENTION

The invention provides an alternative improving the precision of the results, under vector tracking.

The invention is based on carrier phase measurements at the output of the signal processing and on the vector slaving of this same phase using a Kalman filter, with or without inertial coupling. The phase measurement is much more precise than the Doppler measurement and therefore allows better quality navigation.

According to one aspect of the invention, there is proposed a satellite-based positioning receiver, comprising processing channels, each associated with a respective satellite from among N satellites, an extended Kalman filter adapted for performing a vector tracking for the set of satellites using signals received from the N satellites, in which:
the extended Kalman filter is adapted for performing a propagation of an estimated state vector comprising the said position error, and for implementing a matrix propagation equation involving a propagation matrix,
each channel comprising a code phase numerically-controlled oscillator, a carrier phase numerically-controlled oscillator, a code generator, a phase generator, correlators with integrators, and phase and code discriminators,
wherein the extended Kalman filter is adapted for performing a resetting on the basis of the phase error and code error received directly from the phase and code discriminators, of each channel, and in that the receiver comprises first means for calculating the code-wise and carrier-wise control signals for the said code phase and carrier phase numerically-controlled oscillators, on the basis of data provided by the said extended Kalman filter, for each channel.

Such a receiver provides precise measurements (by virtue of the phase) at a more significant jamming robustness level than with conventional scalar loops. This invention applies moreover to all GNSS signals and can be tailored for tracking in mono or multi-frequency mode and in mono or multi-constellation mode.

According to one embodiment, the receiver comprises second optional means for calculating an estimated position of the receiver in a terrestrial reference frame on the basis of a previously calculated position and of an error in this position.

Thus the tracking of the signals and the position calculation are performed in one and the same module by way of the Kalman filter and possibly of the inertia.

In one embodiment, the said extended Kalman filter is adapted for delivering as output, destined for the said second calculation means, estimated corrections of the position and speed of the receiver.

According to one embodiment, the receiver further includes:
first means for slaving the code phase control at the output of the code phase numerically-controlled oscillator to the control signal at the input of the code phase numerically-controlled oscillator delivered by the said first calculation means; and/or
second means for slaving the carrier phase control at the output of the carrier phase numerically-controlled oscillator to the control signal at the input of the phase numerically-controlled oscillator delivered by the said first calculation means.

These slayings make it possible notably to correct the truncation errors of the numerically-controlled oscillators and thus prevent the applied phase from drifting from the controlled phase.

The first calculation means may be adapted for calculating the said code-wise and carrier-wise control signals by respective temporal differentiation of the said estimated code and phase pseudo-distances delivered by the said extended Kalman filter.

Thus the control of the numerically-controlled oscillators is simplified.

According to one embodiment, the said first calculation means are adapted for calculating the said code-wise and carrier-wise control signals by respective finite expansion of the said estimated code and phase pseudo-distances delivered by the extended Kalman filter.

Thus the tracking of the signals is simplified due to the fact that the pseudo-distances are no longer calculated and due to the fact that the position calculation is no longer necessary.

In one embodiment, the extended Kalman filter is adapted for using, in the said matrix propagation equation, the state vector comprising a component representing the ambiguity of the measurement of the carrier pseudo-distance of each satellite.

According to one embodiment, the extended Kalman filter is adapted for using, in the said matrix propagation equation, the state vector comprising a component representing an error related to the propagation of the signal in the ionosphere of each satellite.

In one embodiment, the extended Kalman filter is adapted for using, in the said matrix propagation equation, the state vector comprising a component comprising an error related to the propagation of the signal in the troposphere for each satellite.

According to one embodiment, each channel associated with a satellite comprises two sub-channels receiving from this satellite signals of different carrier frequencies, each of the sub-channels producing phase and code errors.

Thus the estimation of the error related to the propagation of the signal in the ionosphere of each satellite is improved. The precision of the calculated position is therefore better. Moreover, the receiver is more robust to jamming impacting only a single frequency.

In one embodiment, the receiver further includes an inertial centre delivering inertial data to the said first control calculation means, and/or to the said second position calculation module and/or to the said extended Kalman filter.

Thus the Kalman filter can operate at a markedly lower frequency since the drift of the inertial centre is low, for example the frequency of the Kalman filter can go from 50 Hz to 1 Hz.

According to one embodiment, the extended Kalman filter is, furthermore, adapted for delivering corrective signals destined for the said extended Kalman filter and for the said inertial centre.

In one embodiment, the extended Kalman filter constitutes a main filter providing a position calculated in the terrestrial reference frame on the basis of the phase error and code error received directly from the phase and code discriminators of the N satellites, comprising, furthermore, N auxiliary Kalman filters of rank i, an auxiliary filter of rank i receiving the signals of the N satellites with the exception of the satellite of rank i.

According to one embodiment, the receiver further includes third means for calculating a protection radius on the basis of the outputs of the said Kalman filters and means for verifying that this protection radius remains less than or equal to a threshold.

BRIEF DESCRIPTION OF THE DRAWINGS

The invention will be better understood on studying a few embodiments described by way of wholly non-limiting examples and illustrated by the appended drawings in which:

FIG. 9 schematically illustrates a variant embodiment of a receiver according to FIG. 7;

FIG. 10 schematically illustrates an embodiment of a satellite-based positioning receiver with closed-loop inertial coupling;

DETAILED DESCRIPTION

Figure 1A:
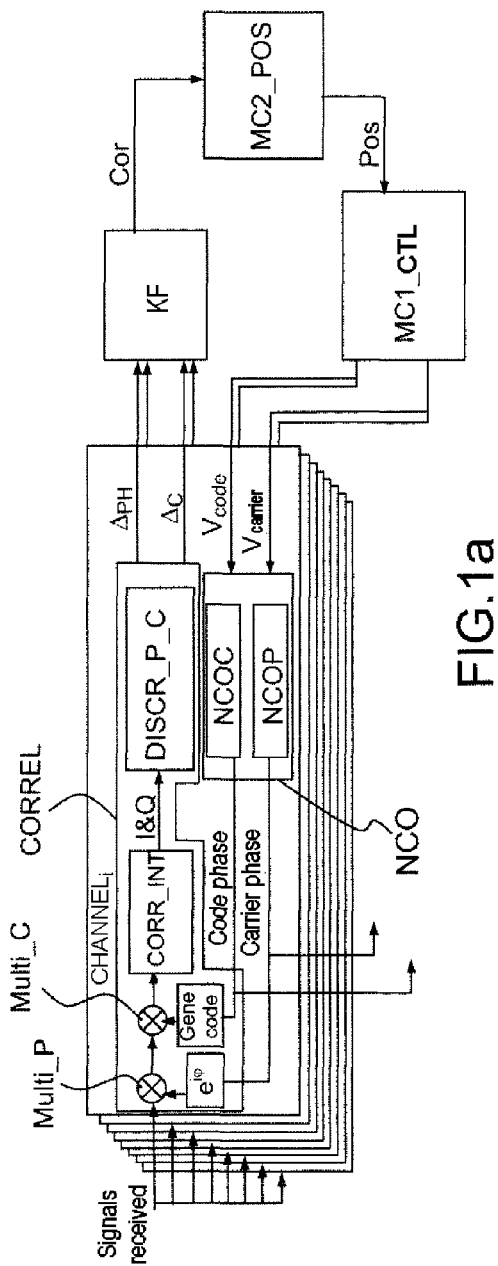
FIGS. 1a and 1b schematically illustrate an embodiment of a satellite-based positioning receiver according to one aspect of the invention.

In the description that follows, similar elements bear the same reference characters.

In FIG. 1a, a satellite-based positioning receiver comprises processing channels $CHANNEL_i$, each associated with a respective satellite from among N satellites, an extended Kalman filter KF adapted for performing a vector tracking, for the set of satellites, of the signals received from the N satellites. The extended Kalman filter KF is adapted for performing a propagation of an estimated state vector comprising the said position error, and for implementing a matrix propagation equation involving a propagation matrix.

Each channel $CHANNEL_i$ comprises a code generator Genecode, a phase generator $e^{i\Phi}$, correlators with integrators CORR_INT, phase and code discriminators DISCR_P_C, a code phase numerically-controlled oscillator NCOC, and a carrier phase numerically-controlled oscillator NCOP. The set formed by the code phase numerically-controlled oscillator NCOC and by the carrier phase numerically-controlled oscillator NCOP is called a block NCO, and the set formed by the phase and code discriminators DISCR_P_C, the correlators with integrators CORR_INT, the phase generator $e^{i\Phi}$ and the code generator Genecode and two respective multipliers MULT_P and MULT_C form a correlator block CORREL.

The extended Kalman filter KF is adapted for performing a resetting on the basis of the phase error $\Delta_{PH}$ and code error $\Delta_C$ received directly from the phase and code discriminators DISCR_P_C, of each channel $CHANNEL_i$, and for producing a correction Cor to be applied to the estimated position. The receiver comprises a first module MC1_CTL for calculating the code control signal $V_{code}$ and carrier control signal $V_{carrier}$ for the said code phase NCOC and carrier phase NCOP numerically-controlled oscillators, on the basis of data Pos provided by a second calculation module, for each channel $CHANNEL_i$. The first module MC2_POS is calculating an estimated position Pos of the receiver in a terrestrial reference frame on the basis of a previously calculated position and of an error in this position Cor.

The local signal leading, lagging and punctual is generated by the code generator Genecode, which generates the spreading code on the basis of a code phase at the output of the code phase numerically-controlled oscillator NCOC, and by the phase generator $e^{i\Phi}$, which generates the carrier on the basis of a carrier phase at the output of the carrier phase numerically-controlled oscillator NCOP.

The code numerically-controlled oscillator NCOC calculates the code phase (akin to a time) by integrating the speed control of the code pseudo-distance ($V_{code}$) and the speed of the code (fixed value which is not represented in the figure). Likewise, the carrier phase numerically-controlled oscillator NCOP calculates the carrier phase (akin to a time) by integrating the speed control of the phase pseudo-distance ($V_{carrier}$) and the central frequency of the carrier (fixed value not represented in FIG. 1a).

The local signal is thereafter correlated with the signal received. The signal obtained is then integrated and filtered in the correlators with integrators CORR_INT. There are at least four correlation pathways which correspond to the in-phase punctual pathway Ip, the quadrature punctual pathway Qp, the leading and lagging pathways or the in-phase delta pathway Idelta and the leading and lagging pathways or the delta quadrature pathway Qdelta. These resulting signals are transmitted as input to the code and phase discriminators DISCR_P_C. The code discriminator provides the error $\Delta_c$ between the code phase at the output of the block NCO and the code phase received. The carrier phase discriminator provides the error $\Delta_{PH}$ between the carrier phase at the output of the block NCO and the carrier phase received. The code discriminator may be for example a "scalar product" discriminator ($\Delta_c$=Ip.Idelta+Qp.Qdelta) and the discriminator may be an "arc tangent" discriminator ($\Delta_{PH}$=arc tangent(Qp/Ip)).

At the output of the discriminators DISCR_P_C, the carrier phase and code phase error measurements are transmitted to the extended Kalman filter KF which will calculate the position and speed corrections Cor. The data Cor are estimated corrections of the position and speed of the receiver. The second calculation module MC2_POS calculates the position and the speed of the carrier, or, stated otherwise, of the receiver, by virtue of these corrections and an estimated position and speed that may originate from the position and speed calculated at the previous instant or from an inertial centre.

The first calculation module MC1_CTL then makes it possible to calculate the controls, i.e. the speeds of the phase and code pseudo-distance that are dispatched to the block NCO.

Figure 1B:
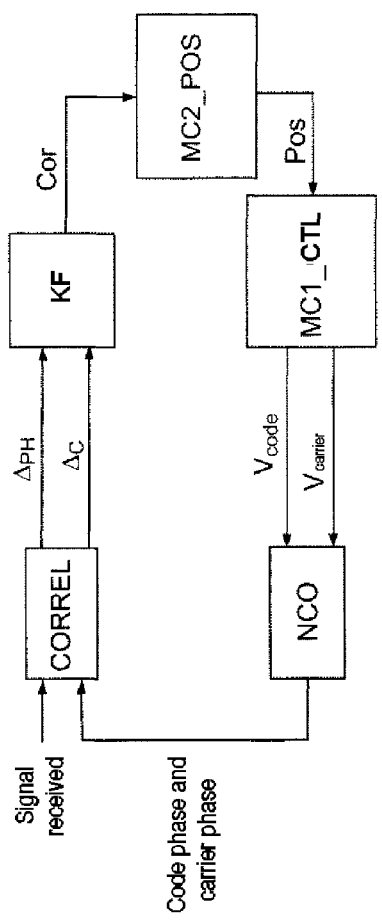

Hence, FIG. 1b represents a receiver according to FIG. 1a in a simplified manner.

In a receiver according to FIG. 1a or 1b, the extended Kalman filter KF operates at a rate of, for example, the order of 50 Hz.

Figure 2:
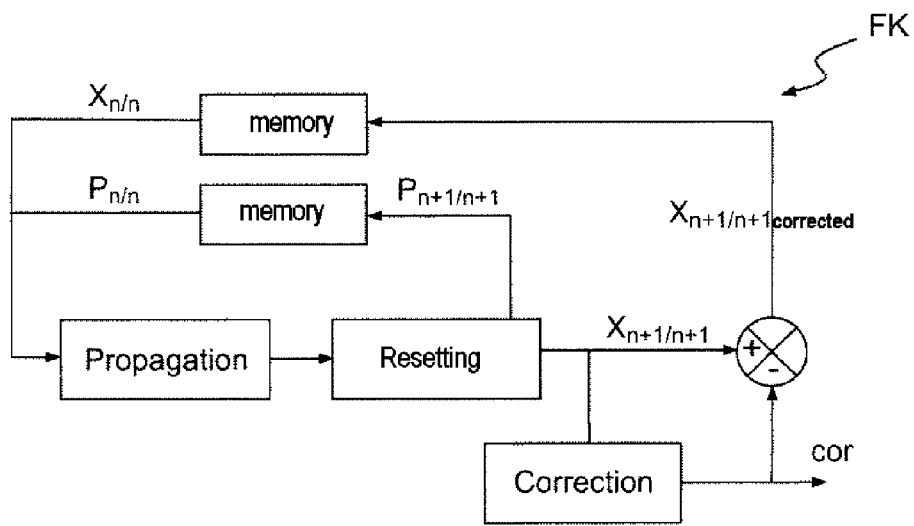
FIG. 2 schematically illustrates an embodiment of the extended Kalman filter of the receiver of FIG. 1a or 1b, according to one aspect of the invention.

FIG. 2 illustrates an embodiment of an extended Kalman filter for a receiver according to FIG. 1a or 1b.

What follows is recalled for a Kalman filter.

The state equation of a Kalman filter is given by the following formula:

$$X_{k+1} = F_k X_k + v_k$$

The states modelling the errors of a satellite-based radionavigation system or GNSS ("Global Navigation Satellite System") are apportioned into various sub-categories:

the receiver position error (3 states), the receiver speed error (3 states), the receiver clock bias (2 states: bias and drift), the ionospheric error (2 states per satellite: bias and drift), the setting of the carrier phase (1 state per satellite in mono-frequency and 2 states per satellite in dual-frequency), the residual errors (2 states per satellite: bias and drift)

It is thus possible to write:

$$X = \begin{pmatrix} X_{dyn} \\ X_{GNSS} \end{pmatrix}$$

in which:

$$X_{dyn} = \begin{pmatrix} X_{Position} \\ X_{Speed} \end{pmatrix}$$

$X_{Position}$ representing the position error, and
$X_{Speed}$ representing the speed error.

$$X_{Speed} = \begin{pmatrix} \delta V_x \\ \delta V_y \\ \delta V_z \end{pmatrix}$$

in which:

$\delta V_x$, $\delta V_y$, $\delta V_z$ represent the speed errors along the axes of the geometric reference frame.

$$X_{Position} = \begin{pmatrix} \delta x \\ \delta y \\ \delta z \end{pmatrix}$$

in which:

$\delta x$, $\delta y$, $\delta z$: represent the position errors along the axes of the geometric reference frame.

$$X_{GNSS} = \begin{pmatrix} X_{clock} \\ X_{iono} \\ X_{setting} \\ X_{residual\ errors} \end{pmatrix}$$

in which:

$$X_{clock} = \begin{pmatrix} Bias_{clock} \\ Drift_{clock} \end{pmatrix}$$

$Bias_{clock}$, $Drift_{clock}$ representing respectively the clock bias and drift of the receiver, $X_{iono}$ representing the bias and the drift of the ionospheric error for each satellite:

$$X_{iono} = \begin{pmatrix} X_{iono}^{sat\ 1} \\ \vdots \\ X_{iono}^{sat\ N} \end{pmatrix} \text{ with } X_{iono}^{sat\ k} = \begin{pmatrix} Bias_{iono}^{sat\ k} \\ Drift_{iono}^{sat\ k} \end{pmatrix}$$

$X_{residual\ errors}$ represents the bias and the drift of the residual errors for each satellite:

$$X_{residual\ errors} = \begin{pmatrix} X_{err}^{sat\ 1} \\ \vdots \\ X_{err}^{sat\ N} \end{pmatrix} \text{ with } X_{err}^{sat\ k} = \begin{pmatrix} Bias_{err}^{sat\ k} \\ Drift_{err}^{sat\ k} \end{pmatrix},$$

and $X_{setting}$ represents the setting of the carrier phase for each tracked frequency of each satellite (2 states per satellite in dual-frequency and 1 state per satellite in mono-frequency):

in mono-frequency:

$$X_{setting} = \begin{pmatrix} b_{phase}^{sat\ 1} \\ \vdots \\ b_{phase}^{sat\ N} \end{pmatrix}$$

in dual-frequency:

$$X_{setting} = \begin{pmatrix} X_{calage}^{L1} \\ X_{calage}^{L2} \end{pmatrix}$$

with:

$$X_{setting}^{L1} = \begin{pmatrix} b_{phase}^{sat\ 1\ L1} \\ \vdots \\ b_{phase}^{sat\ N\ L1} \end{pmatrix} \text{ and } X_{setting}^{L2} = \begin{pmatrix} b_{phase}^{sat\ 1\ L2} \\ \vdots \\ b_{phase}^{sat\ N\ L2} \end{pmatrix}$$

The matrix F (Fk) can then be written:

$$F = \begin{pmatrix} F_{dyn} & 0 \\ 0 & F_{GNSS} \end{pmatrix}$$

in which:

$$F_{dyn} = \begin{pmatrix} I & Te \times I \\ O & I \end{pmatrix}, I = \begin{pmatrix} 1 & 0 & 0 \\ 0 & 1 & 0 \\ 0 & 0 & 1 \end{pmatrix}, \text{ and } O = \begin{pmatrix} 0 & 0 & 0 \\ 0 & 0 & 0 \\ 0 & 0 & 0 \end{pmatrix},$$

Te being the period between two propagation steps (corresponds to the time between two measurements at the output of the discriminators) of the Kalman filter.

$$F_{GNSS} = \begin{pmatrix} F_{clock} & 0 & 0 & 0 \\ 0 & F_{iono} & 0 & 0 \\ 0 & 0 & F_{setting} & 0 \\ 0 & 0 & 0 & F_{residual\ errors} \end{pmatrix},$$

$$F_{clock} = \begin{pmatrix} 0 & 1 \\ 0 & 0 \end{pmatrix},$$

$F_{iono}$ is a block diagonal matrix with diagonal elements $$F_{iono}^{sat\ k} = \begin{pmatrix} 0 & 1 \\ -\omega_0^2 & -2\xi\omega_0 \end{pmatrix}$$

per satellite. The values $\omega_0$ and $\xi$ are parameters representative of the evolution of the ionospheric propagation lag.

$F_{setting}$ is the identity matrix of size N in mono-frequency and of size 2N in dual-frequency, and $F_{residual\ errors}$
is a block diagonal matrix with diagonal elements $$F_{err}^{sat\ k} = \begin{pmatrix} 0 & 1 \\ -\omega_1^2 & -2\xi_1\omega_1 \end{pmatrix}$$

per satellite. The values $\omega_1$ and $\xi_1$ are parameters representative of the evolution of the residual errors.

The observation equation of the extended Kalman filter is given by the following formula:

$$z_k = H_k \times X_k + w_k$$

In a mono-frequency case, we have:

$$Z_k = \begin{pmatrix} \Delta_{PH}^k \\ \Delta_C^k \end{pmatrix}$$

to represent:

$$Z_k = \begin{pmatrix} PD_{PH}^k - PD_{NCO^{PH}}^k \\ PD_C^k - PD_{NCO^C}^k \end{pmatrix} + w_k$$

$$H_k = [\, H_{dyn}^k \quad H_{GNSS}^k \,]$$

with $$H_{dyn} = \begin{pmatrix} H_{pvt} \\ H_{pvt} \end{pmatrix} \begin{matrix} \} \text{ Carrier} \\ \} \text{ Code} \end{matrix}$$

$$H_{pvt} = \begin{bmatrix} \cos(\alpha_1) & \cos(\beta_1) & \cos(\gamma_1) & 1 \\ \vdots & \vdots & \vdots & \vdots \\ \cos(\alpha_m) & \cos(\beta_m) & \cos(\gamma_m) & 1 \end{bmatrix}_{m,4}$$

$$H_{GNSS} = (\, H_{clock} \quad H_{iono} \quad H_{setting} \quad H_{residual\ errors} \,)$$

$$H_{clock} = \begin{pmatrix} -c & 0 \\ \vdots & \vdots \\ \underline{-c} & \underline{0} \\ Clock\ bias & Clock\ drift \end{pmatrix} \text{ of dimension } 2N \times 2$$

in which c represents the speed of light in space.

$$H_{iono} = \begin{pmatrix} I_N & O_N \\ -I_N & O_N \end{pmatrix} \begin{matrix} \} \text{ Carrier} \\ \} \text{ Code} \end{matrix}$$

$$H_{setting} = \begin{pmatrix} I_N & O_N \\ O_N & O_N \end{pmatrix} \begin{matrix} \} \text{ Carrier} \\ \} \text{ Code} \end{matrix}$$

-continued $$H_{residual\ errors} = \begin{pmatrix} 1 & 0 \\ \vdots & \vdots \\ \underline{1} & \underline{0} \\ Bias & Drift \end{pmatrix} \text{ of dimension } 2N \times 2$$

N represents the number of satellites,
$I_N$ represents the identity matrix of size N,
$O_N$ represents the zero matrix of size N×N,
$w_k$ represents the observation noise at the instant k,
$\Delta^k_{PH}$ and $\Delta^k_C$ are vectors of dimension N with components the carrier phase and code phase errors at the output of the discriminators, measured on all the satellites tracked at the instant k,
$PD^k_{PH}$ and $PD^k_C$ are vectors of dimension N with components the true pseudo-distances of the code and of the carrier of all the satellites tracked at the instant k,
$PD_{NCO}{}^k_{PH}$ and $PD_{NCO}{}^k_C$ are vectors of dimension N with components the code and carrier pseudo-distances of all the satellites tracked at the instant k, coherent with the outputs of the block NCO, and
$\cos(\alpha_i)$, $\cos(\beta_i)$, $\cos(\gamma_i)$ are the direction cosines of receiver-satellite axis i (or sight axes) in the geographical reference frame.

In a dual-frequency case L1, L2, we have:

$$Z_k = \begin{pmatrix} \Delta^k_{PH\ L1} \\ \Delta^k_{PH\ L2} \\ \Delta^k_{C\ L1} \\ \Delta^k_{C\ L2} \end{pmatrix}$$

to represent:

$$Z_k = \begin{pmatrix} PD^k_{PH\ L1} - PD^k_{NCO^{PH\ L1}} \\ PD^k_{PH\ L2} - PD^k_{NCO^{PH\ L2}} \\ PD^k_{C\ L1} - PD^k_{NCO^{C\ L1}} \\ PD^k_{C\ L2} - PD^k_{NCO^{C\ L2}} \end{pmatrix} + w_k$$

$$H_k = [H^k_{dyn}\ H^k_{GNSS}]$$

$$H_{dyn} = \begin{pmatrix} H_{pvt} \\ H_{pvt} \\ H_{pvt} \\ H_{pvt} \end{pmatrix} \begin{matrix} \} \text{Carrier } L1 \\ \} \text{Carrier } L2 \\ \} \text{Code } L1 \\ \} \text{Code } L2 \end{matrix}$$

$$H_{GNSS} = (H_{clock}\ H_{iono}\ H_{setting}\ H_{residual\ errors})$$

$$H_{clock} = \begin{pmatrix} -c & 0 \\ \vdots & \vdots \\ \underline{-c} & \underline{0} \\ Clock\ bias & Clock\ drift \end{pmatrix} \text{ of dimension } 4N \times 2.$$

$$H_{iono} = \begin{pmatrix} I_N & O_N \\ U_{iono} \times I_N & O_N \\ -I_N & O_N \\ \underline{-U_{iono} \times I_N} & \underline{O_N} \\ Iono\ bias & Iono\ drift \end{pmatrix} \begin{matrix} \} \text{Carrier } L1 \\ \} \text{Carrier } L2 \\ \} \text{Code } L1 \\ \} \text{Code } L2 \end{matrix}$$

$U_{iono} = (L1/L2)^2$ is the ratio of the two frequencies squared $$H_{setting} = \begin{pmatrix} I_N & O_N \\ O_N & I_N \\ O_N & O_N \\ \underline{O_N} & \underline{O_N} \\ Setting\ L1 & Setting\ L2 \end{pmatrix} \begin{matrix} \} \text{Porteuse } L1 \\ \} \text{Porteuse } L2 \\ \} \text{Code } L1 \\ \} \text{Code } L2 \end{matrix}$$

$$H_{residual\ errors} = \begin{pmatrix} 1 & 0 \\ \vdots & \vdots \\ \underline{1} & \underline{0} \\ Bias & Drift \end{pmatrix} \text{ of dimension } 4N \times 2$$

where $\Delta^k_{pH\ L1}$, $\Delta^k_{C\ L1}$, $\Delta^k_{PH\ L2}$ and $\Delta^k_{C\ L2}$ are the vectors of dimension N with components the carrier phase and code phase errors for L1 and L2 at the output of the discriminators, measured on all the satellites tracked at the instant k, $PD^k_{PH\ L1}$, $PD^k_{C\ L1}$, $PD^k_{PH\ L2}$ and $PD^k_{C\ L2}$ are the vectors of dimension N with components the true pseudo-distances of the code and of the carrier on L1 and L2 of all the satellites tracked at the instant k, and $PD_{NCO}{}^k_{PH\ L1}$, $PD_{NCO}{}^k_{C\ L1}$, $PD_{NCO}{}^k_{PH\ L2}$ and $PD_{NCO}{}^k_{C\ L2}$ are the vectors of dimension N with components the code and carrier pseudo-distances on L1 and L2 of all the satellites tracked at the instant k coherent with the outputs of the block NCO.

The state X of the Kalman filter contains the receiver position error and speed error. The estimation of this error given after resetting of the Kalman filter makes it possible to calculate the correction Cor. The correction $cor_{n+1/n+1}$ applied at the instant n+1 to the estimated position and speed of the position calculation ($G_{n+1/n}$) by the second calculation module MC2_POS is not necessarily consecutive with $X_{n+1/n+1}$ at the instant n+1; it may have a lag between the estimation of the error and the application to the estimated position.

At the moment of the application of the correction to $G_{n+1/n}$, $X_{n+1/n+1}$ must also be updated by this correction $Cor_{n+1/n+1}$. $X_{n+1/n+1}$ then becomes $X_{n+1/n+1}$ corrected in FIG. 2.

Figure 3:
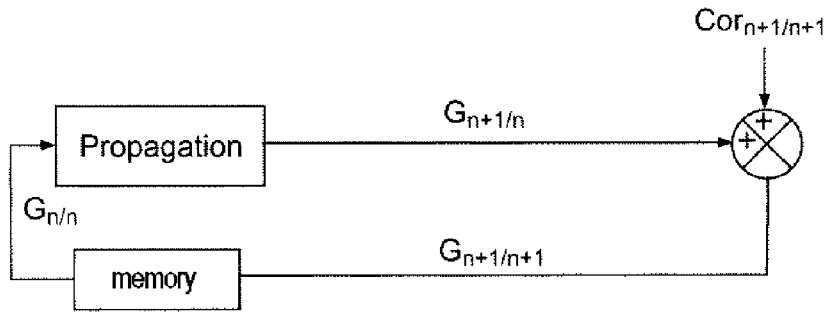
FIG. 3 illustrates the propagation of the position calculation.

As illustrated in FIG. 3, the position Pos also named G may be propagated from one instant to another by the function f:

$$G_{n+1/n} = f(G_{n/n}).$$

We shall now describe the first module MC1_CTL for calculating the control signals of the block NCO. In order for the signal to remain locked on, it is necessary that the pseudo-distances $PD_{NCO}{}^k_{PH}$ and $PD_{NCO}{}^k_C$ measured on the basis of the phases at the output of the block NCO be as close as possible to the true pseudo-distances $PD^k_{PH\ L1}$, $PD^k_{C\ L1}$. One therefore seeks to have at the output of the block NCO the phases which are vectors containing the N respective phases received from the satellites.

In the mono-frequency case, we have:

$$PD^k_{e\ PH} = d_k + C_{PH} H^k_{GNSS} X^{k/k-1}_{GNSS}$$

$$PD^k_{e\ C} = d_k + C_C H^k_{GNSS} X^{k/k-1}_{GNSS}$$

$d_k$ being the vector of the Euclidean distances between the position of the satellites in the terrestrial reference frame at the instant k (given by the ephemerides) and the estimated position $G_{k/k-1}$ of the receiver in the same reference frame at the same instant t.

We have: $C_{PH} = [I_N\ O_N]$ and $C_C = [O_N\ I_N]$

In the dual-frequency case, we have:

$$PD^k_{e\ PH\ L1} = d_k + C_{PH\ L1} H^k_{GNSS} X^{k/k-1}_{GNSS}$$

$$PD^k_{e\ PH\ L2} = d_k + C_{PH\ L2} H^k_{GNSS} X^{k/k-1}_{GNSS}$$

$$PD^k_{e\ C\ L1} = d_k + C_{C\ L1} H^k_{GNSS} X^{k/k-1}_{GNSS}$$

$$PD_{e}^{k}{}_{CL2} = d_k + C_{CL2} H^k{}_{GNSS} X^{k/k-1}{}_{GNSS}$$

$$C_{PHL1} = [I_N O_N O_N O_N], C_{PHL2} = [O_N I_N O_N O_N], C_{CL1} = [O_N O_N I_N O_N] \text{ and}$$

$$C_{CL2} = [O_N O_N O_N I_N].$$

The first module MC1_CTL for calculating controls of the block NCO can perform a differentiation of the estimated pseudo-distances.

In this case of use, the controls $V_{code}$ and $V_{carrier}$ dispatched to the block NCO are calculated by differentiating the pseudo-distances $PD_{e}^{k}{}_{PH}$ and $PD_{e}^{k}{}_{C}$.

$$V_{code}^k = (PD_{e}^{k}{}_{C} - PD_{e}^{k-1}{}_{C})/T_e \text{ and } v_{carrier}^k = (PD_{e}^{k}{}_{PH} - PD_{e}^{k-1}{}_{PH})/T_e$$

Figure 4:
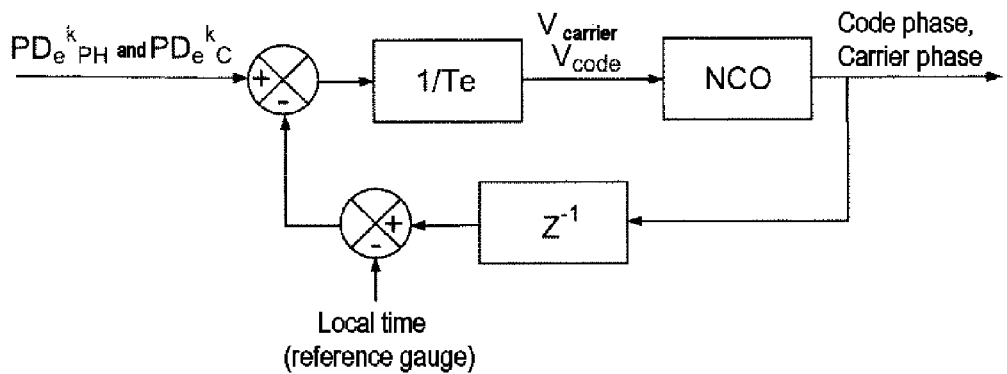
FIGS. 4 and 5 illustrate two embodiments of slayings in a receiver of FIG. 1a or 1b according to one aspect of the invention.
Figure 5:
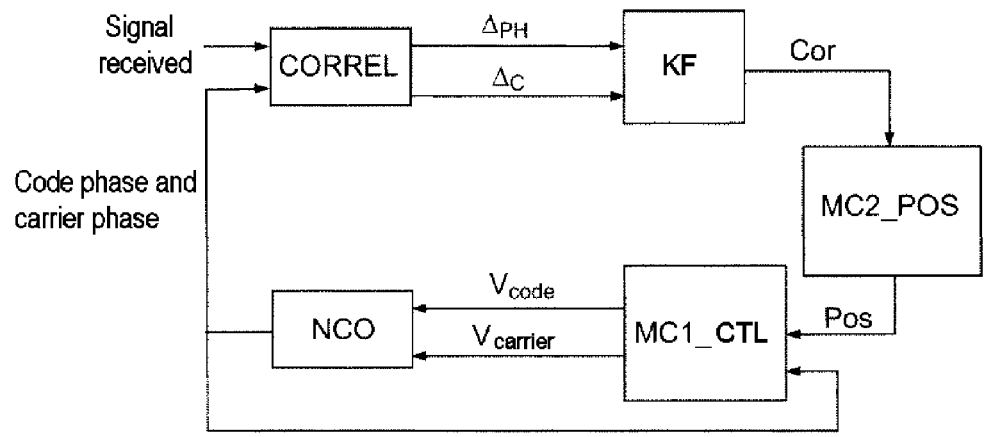

As a variant, it is possible to perform a slaving of the phases at the output of the block NCO to the phases calculated on the basis of the pseudo-estimated distances as illustrated in FIGS. 4 and 5.

So that the output of the block NCO does not drift because of numerical truncations, it is possible to effect a slaving of the outputs $PD_{NCO}^{k}{}_{PH}$ and $PD_{NCO}^{k}{}_{C}$ of the numerically-controlled oscillators NCOC, NCOP to the estimated pseudo-distances $PD_{e}^{k}{}_{PH}$ and $PD_{e}^{k}{}_{C}$, as illustrated in FIG. 5.

In another variant, the controls of the block NCO may be determined, in the first module MC1_CTL for control calculation, by differentiating the state of the Kalman filter KF.

In this case, it is not relevant to implement a resetting on the position G. The Kalman filter then serves only for the slaving of the code and carrier loops, the states of the filter possibly drifting from the true values on account of the non-linearity errors in the formulation of H.

The controls $v_{code}$ and $v_{carrier}$ dispatched to the numerically-controlled oscillators NCOP and NCOC of the block NCO are then calculated directly using the increments of the states through the following relations:

$$v_{carrier}^k = C_{PH}^* \left( H^k \frac{X^{k/k-1} - X^{k-1/k-2}}{Te} - H_{dyn} Vsat \right)$$

$$v_{code}^k = C_C^* \left( H^k \frac{X^{k/k-1} - X^{k-1/k-2}}{Te} - H_{dyn} Vsat \right)$$

Figure 6:
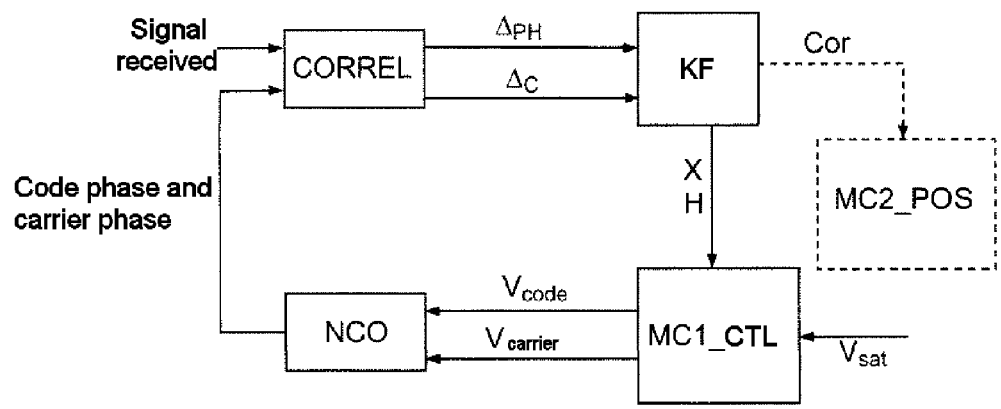
FIG. 6 illustrates an embodiment of a receiver according to FIG. 1a or 1b, by differentiating the state of the Kalman filter KF.

Vsat being the vector whose components are the speeds of the satellites in the geographical reference frame. Such an embodiment is illustrated in FIG. 6, for which the second module MC2_POS for position calculation is then optional.

Figure 7:
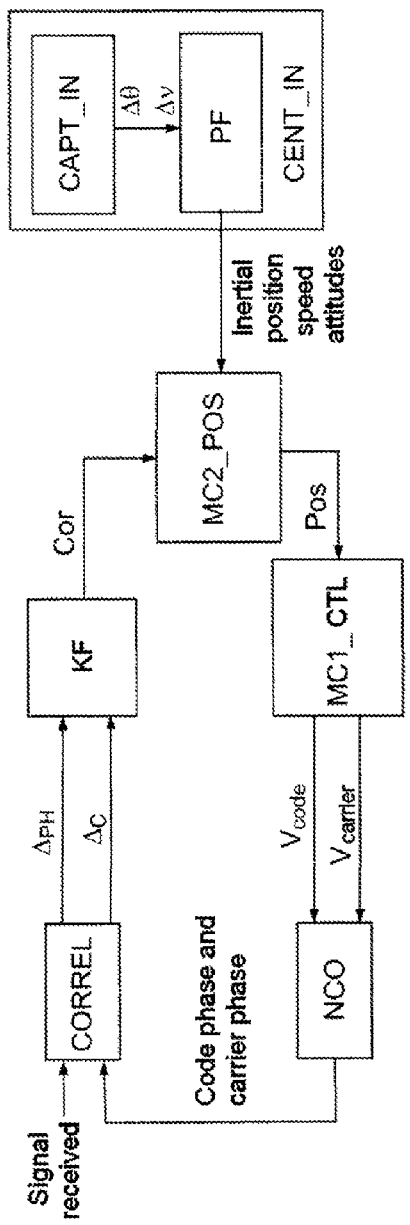
FIG. 7 schematically illustrates an embodiment of a satellite-based positioning receiver with open-loop inertial coupling.

In FIG. 7 is illustrated an embodiment of a satellite-based positioning receiver with open-loop inertial coupling, comprising, in addition to the elements of the receiver of FIG. 1b, an inertial centre CENT_IN, comprising inertial sensors CAPT_IN and an inertial platform PF.

The inertial sensors CAPT_IN provide the increments of attitude and of speed to the platform PF which integrates them from an initialization point. The aggregated errors of the inertial sensors CAPT_IN cause the elements (attitude, position, speed and acceleration) provided by the platform PF to the second module MC2_POS for position calculation to diverge over time. The Kalman Filter KF calculates these errors of the inertial platform PF by virtue of the phase and code measurements at the output of the discriminators of each channel. It operates at a relatively low speed, of the order of 1 Hz, so as to reduce the calculational load.

Figure 8:
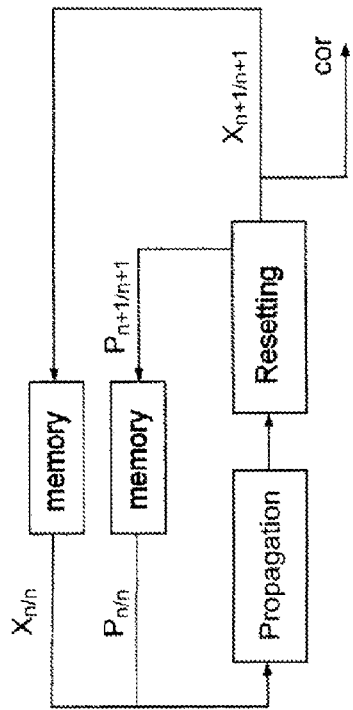
FIG. 8 schematically illustrates an embodiment of the extended Kalman filter of the receiver of FIG. 7, according to one aspect of the invention.

In this case, the Kalman filter KF may be embodied as illustrated in FIG. 8. The state equation of the Kalman filter is then given by the following formula:

$$X_{k+1} = F_k X_k + v_k$$

The states modelling the errors of the radionavigation system are apportioned into various sub-categories:
- the inertial attitude errors along the North, East and Vertical axes,
- the inertial speed errors in the North, East and Vertical axes,
- the inertial longitude, latitude and altitude errors,
- the gyrometer errors along the axes x, y and z of the carrier,
- the errors of accelerometers along the axes x, y and z of the carrier,
- the clock bias (2 states: bias and drift),
- the ionospheric error (2 states per satellite: bias and drift),
- the phase setting (1 state per satellite), and
- the residual errors (2 states per satellite: bias and drift).

It is therefore possible to write:

$$X = \begin{pmatrix} X_{INS} \\ X_{GNSS} \end{pmatrix}$$

in which:

$$X_{INS} = \begin{pmatrix} X_{attitude} \\ X_{speed} \\ X_{position} \\ X_{gyrometers} \\ X_{accelerometers} \end{pmatrix}$$

$$X_{attitude} = \begin{pmatrix} \delta\varphi_N \\ \delta\varphi_E \\ \delta\varphi_V \end{pmatrix}$$

is a vector whose components are the inertial attitude errors along the North, East and Vertical axes $$X_{speed} = \begin{pmatrix} \delta V_N \\ \delta V_E \\ \delta V_V \end{pmatrix}$$

is a vector whose components are the inertial speed errors along the North, East and Vertical axes, $$X_{position} = \begin{pmatrix} \delta L \\ \delta G \\ \delta h \end{pmatrix}$$

is a vector whose components are the inertial longitude, latitude and altitude errors, $$X_{gyrometer} = \begin{pmatrix} \delta\omega_X \\ \delta\omega_Y \\ \delta\omega_Z \end{pmatrix}$$

is a vector whose components are the errors of gyrometers along the axes x, y and z of the carrier, $$X_{accelerometer} = \begin{pmatrix} \delta f_X \\ \delta f_Y \\ \delta f_Z \end{pmatrix}$$

is a vector whose components are the errors of accelerometers along the axes x, y and z of the carrier, and
$X_{GNSS}$ is defined previously.

The matrix F which is the linearized matrix at the operating point of the inertial platform PF may therefore be written:

$$F = \begin{pmatrix} F_{INS} & 0 \\ 0 & F_{GNSS} \end{pmatrix}$$

in which:

$F_{INS}$ is the following 15×15 matrix, whose first six columns are presented in Table 1, followed by its last nine columns in Table 2:

TABLE 1

|  | $X_{attitude}$ | | | $X_{speed}$ | | |
|---|---|---|---|---|---|---|
| $X_{attitude}$ | 1 | $-a_1$ | $V_N/(Rn + h)$ | 0 | $-1/(Re + h)$ | 0 |
|  | $a_1$ | 1 | $a_2$ | $1/(Re + h)$ | 0 | 0 |
|  | $-V_N/(Rn + h)$ | $-a_2$ | 1 | 0 | $\tan(L)/(Re + h)$ | 0 |
| $X_{speed}$ | 0 | $f_V$ | $-f_E$ | 1 | 0 | 0 |
|  | $-f_V$ | 0 | $f_N$ | 0 | 1 | 0 |
|  | $f_E$ | $-f_N$ | 0 | 0 | 0 | 1 |
| $X_{position}$ | 0 | 0 | 0 | $1/(Rn + h)$ | 0 | 0 |
|  | 0 | 0 | 0 | 0 | $-1/(Re + h)\cos(L)$ | 0 |
|  | 0 | 0 | 0 | 0 | 0 | $-1$ |
| $X_{gyrometer}$ | 0 | 0 | 0 | 0 | 0 | 0 |
|  | 0 | 0 | 0 | 0 | 0 | 0 |
|  | 0 | 0 | 0 | 0 | 0 | 0 |
| $X_{accelerometer}$ | 0 | 0 | 0 | 0 | 0 | 0 |
|  | 0 | 0 | 0 | 0 | 0 | 0 |
|  | 0 | 0 | 0 | 0 | 0 | 0 |

TABLE 2

| $X_{position}$ | | | $X_{gyrometer}$ | | | $X_{accelerometer}$ | | |
|---|---|---|---|---|---|---|---|---|
| $\Omega_T \sin(L)$ | 0 | 0 | B | | | 0 | 0 | 0 |
| 0 | 0 | 0 | | | | 0 | 0 | 0 |
| $a_3$ | 0 | 0 | | | | 0 | 0 | 0 |
| 0 | 0 | 0 | 0 | 0 | 0 | B | | |
| 0 | 0 | 0 | 0 | 0 | 0 | | | |
| $a_4$ | 0 | $-k_2$ | 0 | 0 | 0 | | | |
| 1 | 0 | 0 | 0 | 0 | 0 | 0 | 0 | 0 |
| $V_E \sin(L)/(Re + h)\cos^2(L)$ | 1 | 0 | 0 | 0 | 0 | 0 | 0 | 0 |
| $-a_4/2$ | 0 | 1 | 0 | 0 | 0 | 0 | 0 | 0 |
| 0 | 0 | 0 | 1 | 0 | 0 | 0 | 0 | 0 |
| 0 | 0 | 0 | 0 | 1 | 0 | 0 | 0 | 0 |
| 0 | 0 | 0 | 0 | 0 | 1 | 0 | 0 | 0 |
| 0 | 0 | 0 | 0 | 0 | 0 | 1 | 0 | 0 |
| 0 | 0 | 0 | 0 | 0 | 0 | 0 | 1 | 0 |
| 0 | 0 | 0 | 0 | 0 | 0 | 0 | 0 | 1 | with:

$$a_1 = \Omega_T \sin(L) + \frac{V_E}{R_E + h}\tan(L),$$

$$a_2 = \Omega_T \cos(L) + \frac{V_E}{R_E + h},$$

$$a_3 = \Omega_T \cos(L) + (1 + \tan^2(L))\frac{V_E}{R_E + h},$$

$$a_4 = 2\Omega_T \sin(L) V_E,$$

L, G and h are respectively the hybrid latitude, longitude and altitude i.e. after correction by the Kalman filter KF,
$V_N$, $V_E$ and $V_V$ are respectively the hybrid North, East and Vertical speeds,
$f_N$, $f_E$ and $f_V$ are respectively the hybrid North, East and Vertical specific forces,
Re, Rn are respectively the East and North radii of curvature of the Earth locally,
B is the matrix for going from the carrier reference frame (x,y,z) to the Local Geographic Trihedron (North, East, Vertical),
$\Omega_T$ is the speed of rotation of the Earth,
$k2=3.1e-6 \text{ s}^{-1}$, and
$F_{GNSS}$ is defined previously.

The Kalman filter KF can then be defined by:

$$H_k = [H^k_{INS} H^k_{GNSS}]$$

$$H_{INS} = (0_{q,6} H_{dyn} 0_{q,6}),$$

q=2*N in mono-frequency and 4*N in dual-frequency.

The state X of the Kalman filter KF contains the position error, the speed error and the attitude error for the inertial centre CENT_IN. Estimation of this error given after resetting of the Kalman filter KF makes it possible to calculate the correction Cor.

The corrections Cor are applied directly to the position, speed and attitude of the inertial centre to obtain the corrected position, speed and attitude.

Just as previously, the first module MC1_CTL for calculating controls of the block NCO can perform a differentiation of the estimated pseudo-distances, or, as a variant, perform a slaving of the pseudo-distances NCO to the estimated pseudo-distances.

In another variant, illustrated in FIG. 9, the controls of the block NCO may be determined, in the first module MC1_CTL for control calculation, by differentiating the state of the Kalman filter KF and using the speed-wise inertial aids.

In this case, it is not relevant to implement a resetting on the position G. The Kalman filter then serves only for the slaving of the code and carrier loops, the states of the filter possibly drifting from the true values on account of the non-linearity errors in the formulation of H.

The controls $v_{code}$ and $v_{carrier}$ dispatched to the numerically-controlled oscillators NCOP and NCOC of the block NCO are then calculated directly using the increments of the states through the following relations, in which the part of the pseudo-distance due to the dynamics of the carrier is given by the inertial centre:

$$V_{code}^k = C_C^* \left( H^k \frac{X^{k/k-1} - X^{k-1/k-2}}{Te} - H_{dyn}Vsat + H_{dyn}V_{INS} \right)$$

$$V_{carrier}^k = C_{PH}^* \left( H^k \frac{X^{k/k-1} - X^{k-1/k-2}}{Te} - H_{dyn}Vsat + H_{dyn}V_{INS} \right)$$

$V_{INS}$ being the speed given by the inertial platform.

The position calculation is then no longer necessary, so the second calculation module MC2_POS is optional.

In FIG. 10 is illustrated a receiver similar to that of FIG. 9, but with closed-loop inertial coupling. The inertial platform PF is reset on the basis of the errors or corrections Cor delivered by the Kalman Filter KF. This allows the operation of the inertial centre CENT_IN to be made as linear as possible. The position calculation is then no longer necessary, so the second calculation module MC2_POS is then irrelevant.

Figure 11:
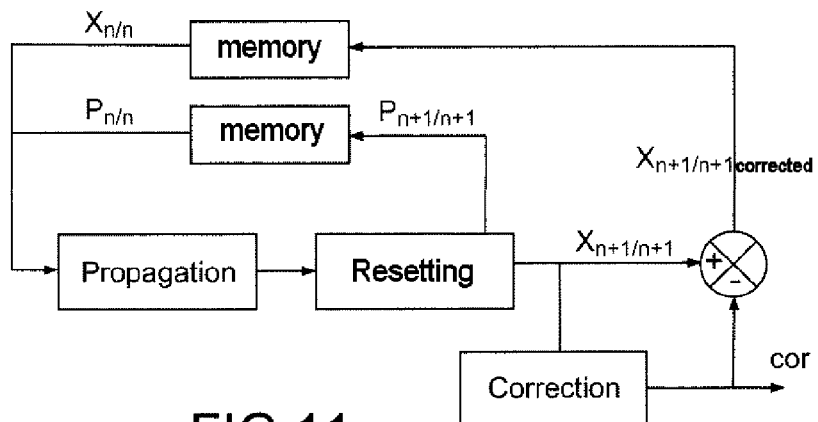
FIG. 11 schematically illustrates an embodiment of the extended Kalman filter of the receiver of FIG. 10, according to one aspect of the invention.

When each correction Cor is received, the platform PF updates its states and gives the dynamics of the carrier about its new operating point. The states of the Kalman Filter KF are not changed, as illustrated in FIG. 11.

When the correction Cor is applied to the inertia, it must also be applied to the Kalman filter KF: the correction $cor_{n+1/n+1}$ applied at the instant n+1 to the inertial centre is not necessarily consecutive with $X_{n+1/n+1}$ at the instant n+1; there may be a lag between the estimation of the error and the application. At the moment of the application of the correction to $G_{n+1/n}$, $X_{n+1/n+1}$ must also be updated by this correction $Cor_{n+1/n+1}$. $X_{n+1/n+1}$ then becomes $X_{n+1/n+1}$ corrected in FIG. 11.

The second module MC2_POS for position calculation is then irrelevant.

We shall now describe the first module MC1_CTL for calculating the control signals of the block NCO.

The first module MC1_CTL for calculating controls for the block NCO can perform a differentiation of the estimated pseudo-distances, or a slaving of the phases NCO to the estimated pseudo-distances, as was described previously.

As a variant, the first calculation module MC1_CTL calculates the code-wise and carrier-wise control signals $V_{code}$ and $V_{carrier}$ by differentiating the state of the Kalman filter KF and speed-wise inertial aids.

The code-wise and carrier-wise control signals $V_{code}$ and $V_{carrier}$ for the block NCO are calculated in a manner similar to the case by differentiating the state of the Kalman filter KF of the embodiment without inertial coupling, except that the part of the pseudo-distance due to the dynamics of the carrier is given by the inertial centre CENT_IN:

$$V_{code}^k = C_C^* \left( H^k \frac{X^{k/k-1} - X^{k-1/k-2}}{Te} - H_{dyn}Vsat + H_{dyn}(P_{INS}^k - P_{INS}^{k-1})/Te \right)$$

$$V_{carrier}^k = C_{PH}^* \left( H^k \frac{X^{k/k-1} - X^{k-1/k-2}}{Te} - H_{dyn}Vsat + H_{dyn}(P_{INS}^k - P_{INS}^{k-1})/Te \right)$$

$P_{INS}$ is the position given by the inertial platform PF.

In this case, it is no longer possible to use the speed since there is an incoherence between the position and the inertial speed because of the correction.

As seen previously, the invention affords improvements to the precision of the tracking of the signals of a satellite-based positioning system while being more robust to interference. The invention affords improvements to the integrity, this being particularly significant for applications involving the safety of people's lives.

In the three configurations described previously of the first calculation module MC1_CTL, the invention makes it possible to maintain the tracking of the code and of the phase at higher interference levels than with conventional tracking loops. The innovation presented in this paragraph then consists in using the measurements of pseudo-distances at the output of the block NCO independently of the Kalman filter KF used for the tracking. These measurements are used in a conventional position and speed calculation with integrity check. This may be done with or without hybridization with the inertia, by least squares or by Kalman filter.

The integrity may be improved by using the filter which controls the tracking of the signals as main filter. We describe, in the following paragraph, the general operation of the maximum separation process which applies to the following cases. In these is described the way in which auxiliary filters are implemented to improve the integrity of the receiver.

Concerning the maximum separation, when a bias appears in the pseudo-distance of a satellite, the position calculated by the receiver is biased. To avoid providing a poor position, it is then necessary to provide an integrity check.

If n is the total number of satellites tracked by the main filter, when the pseudo-distance of a satellite is biased, from among the n subsets of n−1 satellites at least one does not contain the fault. The maximum separation process therefore consists in creating n auxiliary Kalman filters $KF\_AUX_i$ with n−1 satellites and a main filter KF with the n satellites.

The detection of the fault is done by comparing the difference in position calculated between the auxiliary filters $KF\_AUX_i$ and the main filter KF and a threshold. Since the statistical representation of this difference without any fault is known, the detection threshold Th is then chosen with respect to a false alarm probability.

The integrity limit IL is the sum of the maximum error attainable before detection between an auxiliary filter $KF\_AUX_i$ and the main filter KF, corresponding to the detection threshold Th increased by a term in kσ around the auxiliary filter $KF\_AUX_i$, k being a confidence parameter and σ representing the variance-covariance matrix of the sub-filter:
IL=Th+kσ.

The final integrity limit is the maximum of the integrity limits of the auxiliary filters $KF\_AUX_i$.

In the case of absence of inertial coupling CENT_IN, the state model and observation model of the auxiliary filters KF_AUXi are identical to those of the main filter KF, which were described previously in the absence of inertial coupling, except that the signals of one of the satellites are not used. These auxiliary filters KF_AUXi do not participate in the formulation of the controls of the block NCO and operate at a lower frequency therefore.

The resetting of an auxiliary Kalman filter $KF\_AUX_i$ is done directly on the pseudo-distances measured at the output of the block NCO:

$$Z_k = \begin{pmatrix} PD_{PH}^k - PD_{NCO\,PH}^k \\ PD_C^k - PD_{NCO\,C}^k \end{pmatrix} + w_k \text{ or}$$

Figure 12:
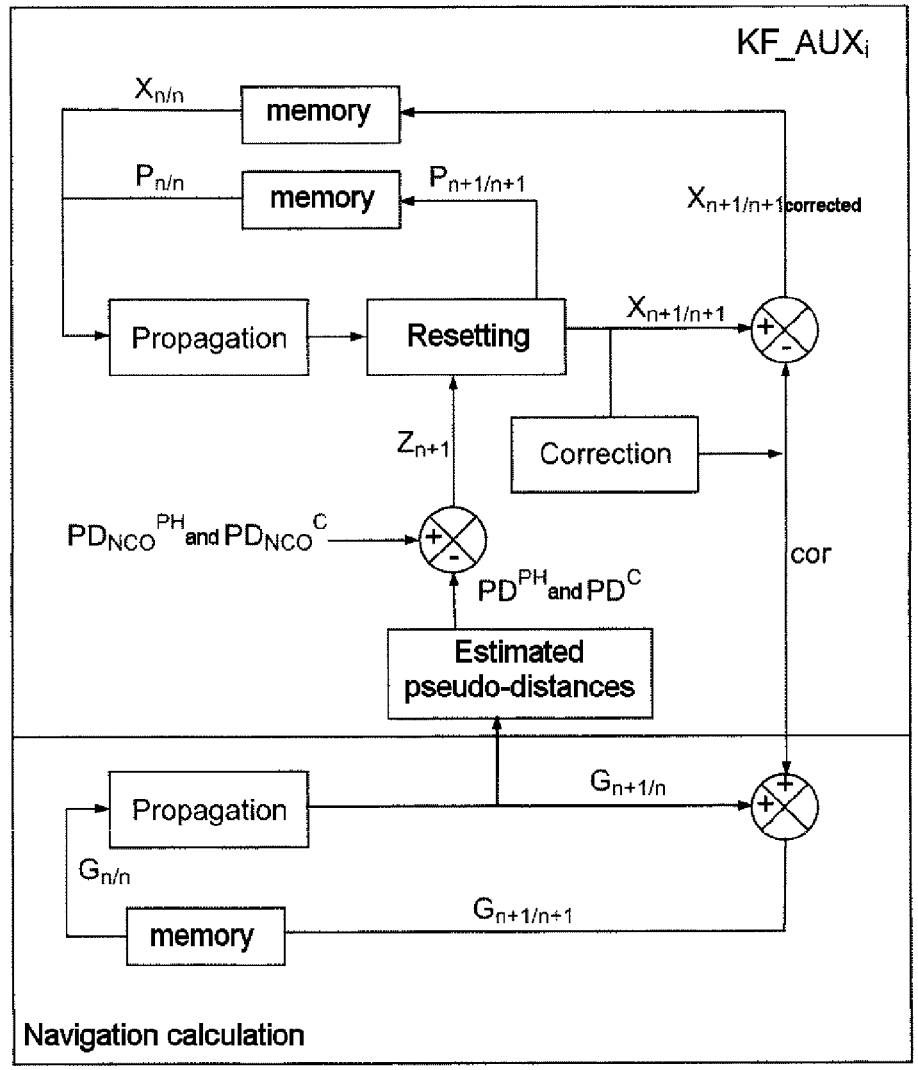
FIG. 12 illustrates an embodiment of an auxiliary filter for improving integrity in the case of absence of inertial coupling.
Figure 13:
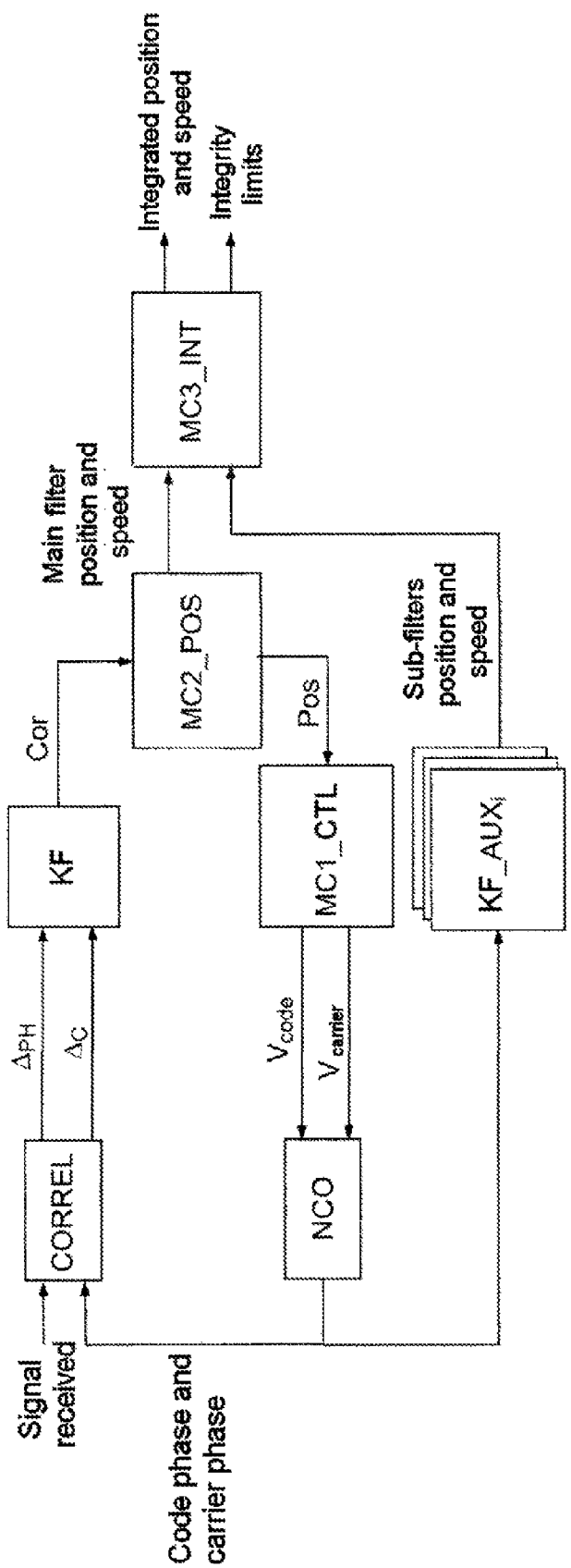
FIG. 13 schematically illustrates an embodiment of a receiver of FIG. 1a or 1b with integrity calculation with multidimensional loops, without inertial coupling, according to one aspect of the invention.

-continued $$Z_k = \begin{pmatrix} PD^k_{PH\ L1} - PD^k_{NCO^{PH}\ L1} \\ PD^k_{PH\ L2} - PD^k_{NCO^{PH}\ L2} \\ PD^k_{C\ L1} - PD^k_{NCO^{C}\ L1} \\ PD^k_{C\ L2} - PD^k_{NCO^{C}\ L2} \end{pmatrix} + w_k$$

with $PD_{NCO}^{PH}$ and $PD_{NCO}^{C}$ taken at the output of the block NCO and $PD_{PH}$ and $PR_C$ the pseudo-distances estimated in the filter. An exemplary embodiment of an auxiliary Kalman filter $KF\_AUX_i$ such as this is illustrated in FIG. 12, for a receiver according to the invention with integrity calculation with multidimensional loops without inertial coupling such as illustrated in FIG. 13.

Figure 14:
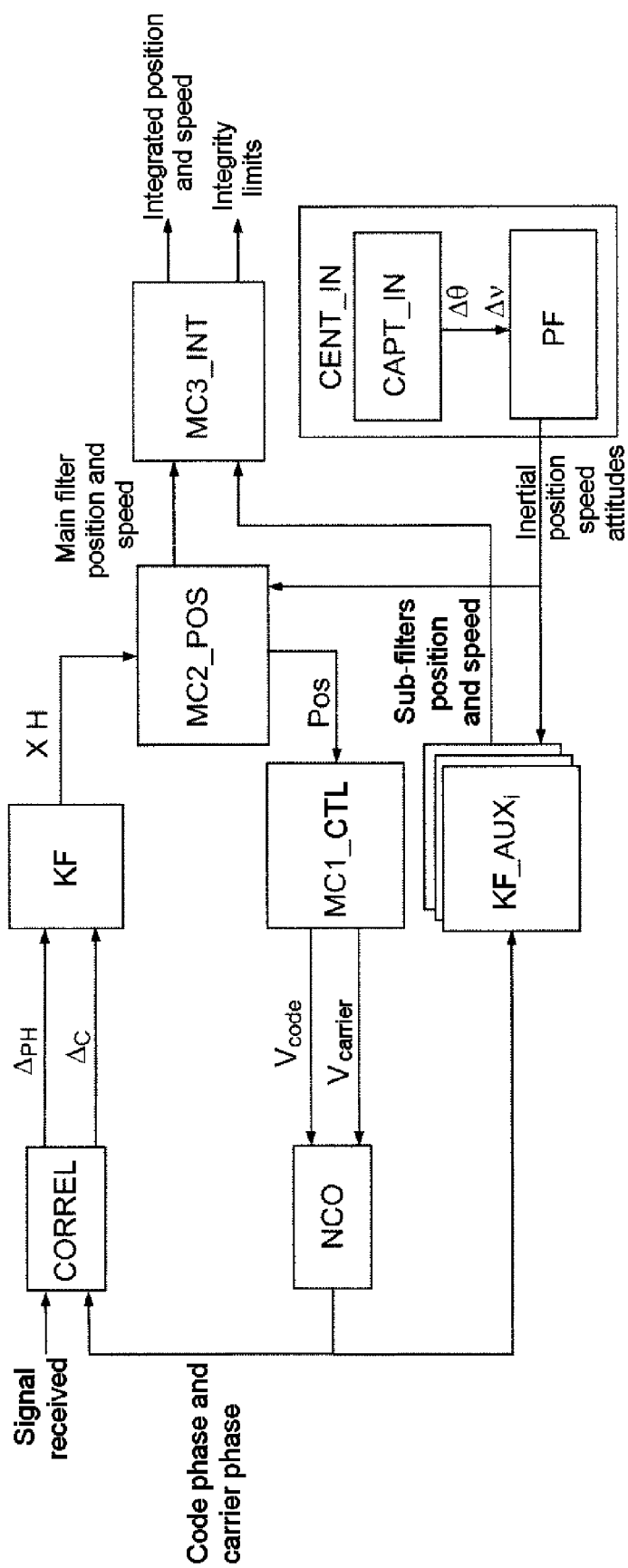
FIG. 14 schematically illustrates an embodiment of a receiver of FIG. 7 with integrity calculation with multidimensional loops, with open-loop inertial coupling, according to one aspect of the invention.
Figure 15:
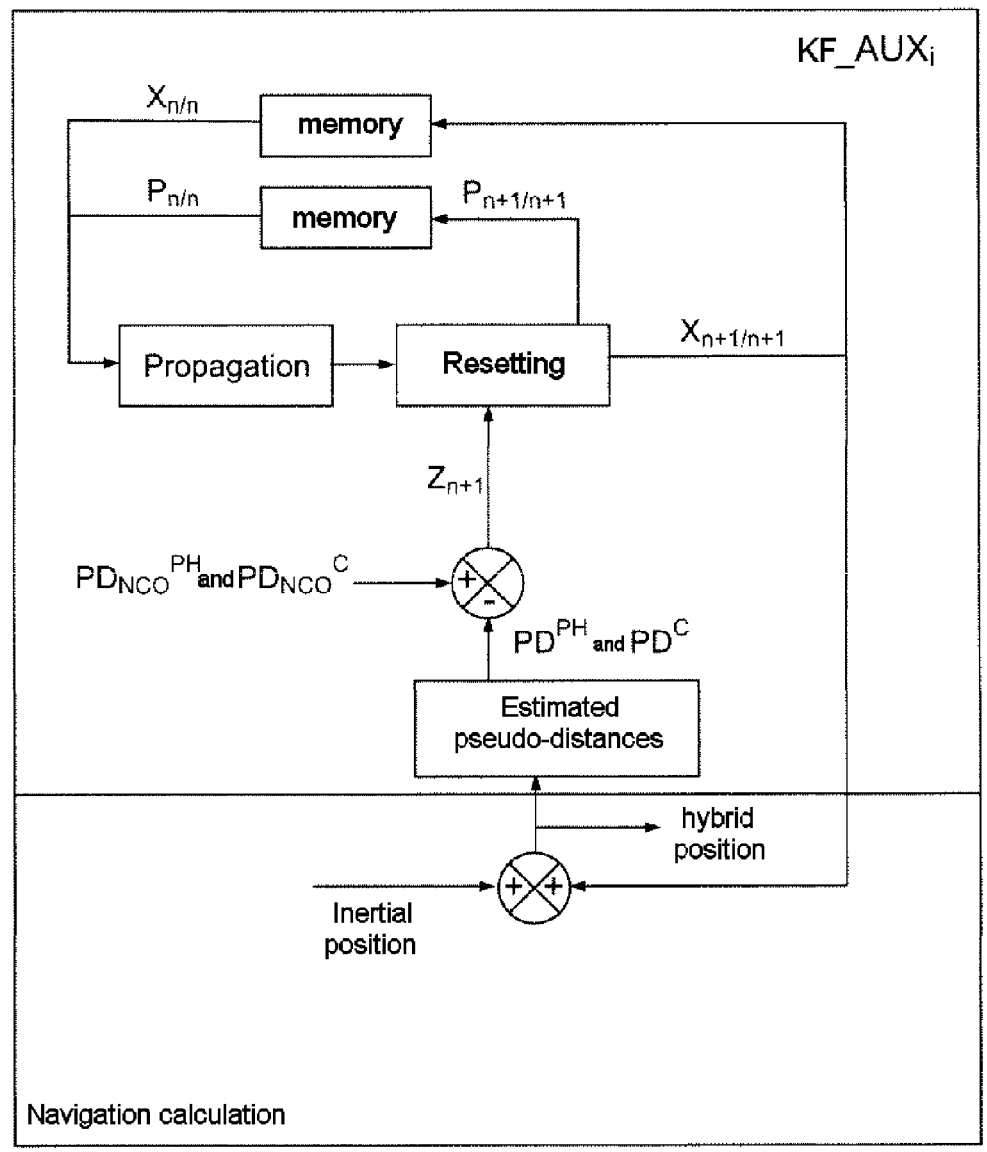
FIG. 15 illustrates an embodiment of an auxiliary filter for improving integrity in the case of open-loop inertial coupling.

In the case of open-loop inertial coupling, as illustrated in FIG. 14 the state model and observation model of the auxiliary Kalman filters $KF\_AUX_i$, illustrated in FIG. 15 are identical to the main Kalman filter KF, which were described previously in the presence of inertial coupling, except that the signals of one of the satellites are not used. These auxiliary filters $KF\_AUX_i$ do not participate in the formulation of the controls of the block NCO. The resetting of an auxiliary filter $KF\_AUX_i$ is done directly on the measured pseudo-distances at the output of the block NCO:

$$Z_k = \begin{pmatrix} PD^k_{PH} - PD^k_{NCO^{PH}} \\ PD^k_{C} - PD^k_{NCO^{C}} \end{pmatrix} + w_k \text{ or}$$

$$Z_k = \begin{pmatrix} PD^k_{PH\ L1} - PD^k_{NCO^{PH}\ L1} \\ PD^k_{PH\ L2} - PD^k_{NCO^{PH}\ L2} \\ PD^k_{C\ L1} - PD^k_{NCO^{C}\ L1} \\ PD^k_{C\ L2} - PD^k_{NCO^{C}\ L2} \end{pmatrix} + w_k$$

$PD_{NCO}^{PH}$ and $PD_{NCO}^{C}$ are taken at the output of the block NCO and $PD_{PH}$ and $PD_C$ are the pseudo-distances estimated in the auxiliary filter $KF\_AUX_i$.

Figure 16:
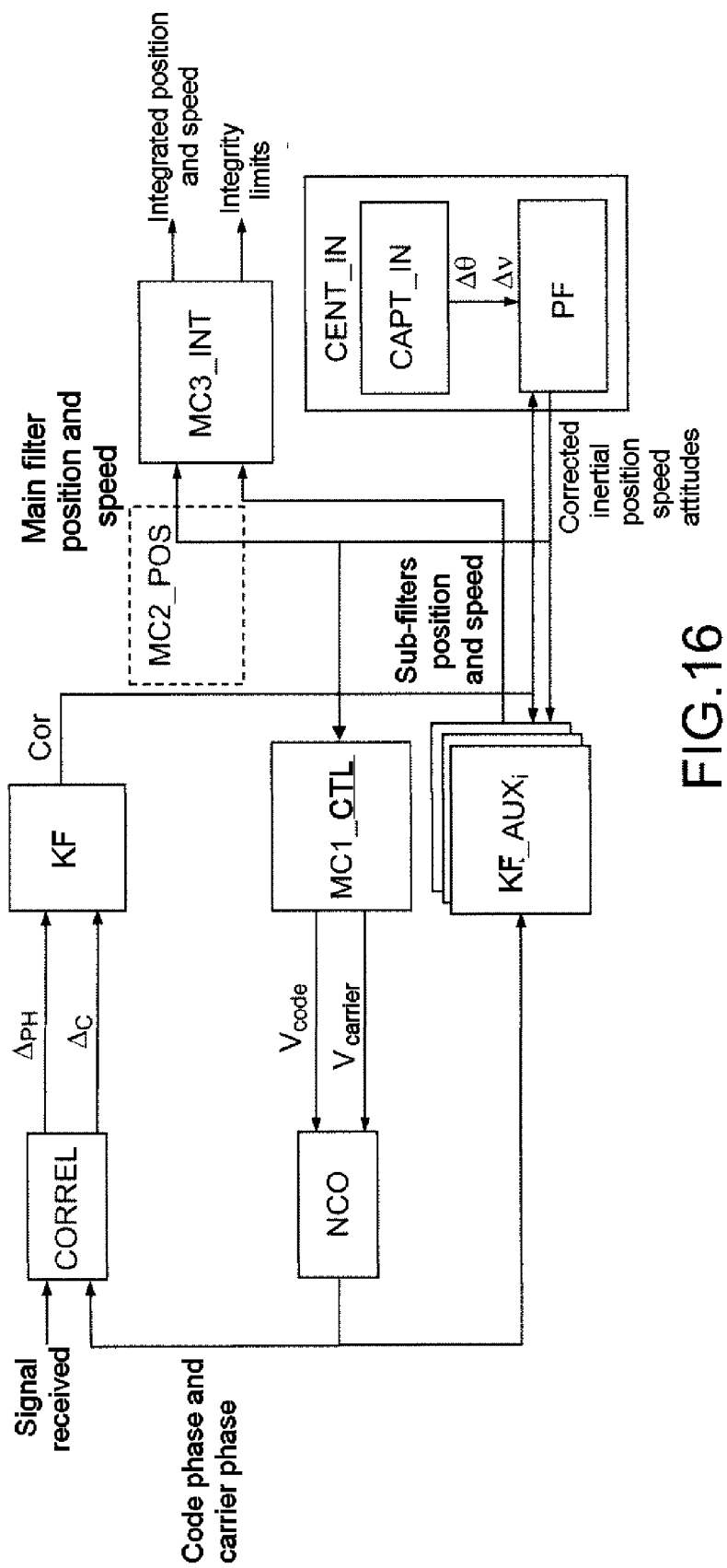
FIG. 16 schematically illustrates an embodiment of a receiver of FIG. 10 with integrity calculation with multidimensional loops, with closed-loop inertial coupling, according to one aspect of the invention.

In the case of closed-loop inertial coupling, such as illustrated in FIG. 16 the configuration is equivalent to the previous one if only in that the main filter KF corrects the inertial drift. The auxiliary filters $KF\_AUX_i$ use this correction in the propagation of their state as is described in French patent No. 05 12992 (Thales) which is analogous for scalar GNSS signal processing loops. The position calculation is then no longer necessary, so the second calculation module MC2_POS is irrelevant.

In this part, we are interested in the improvements that can be afforded by the invention to applications requiring precision positioning in an environment with interference.

Figure 17:
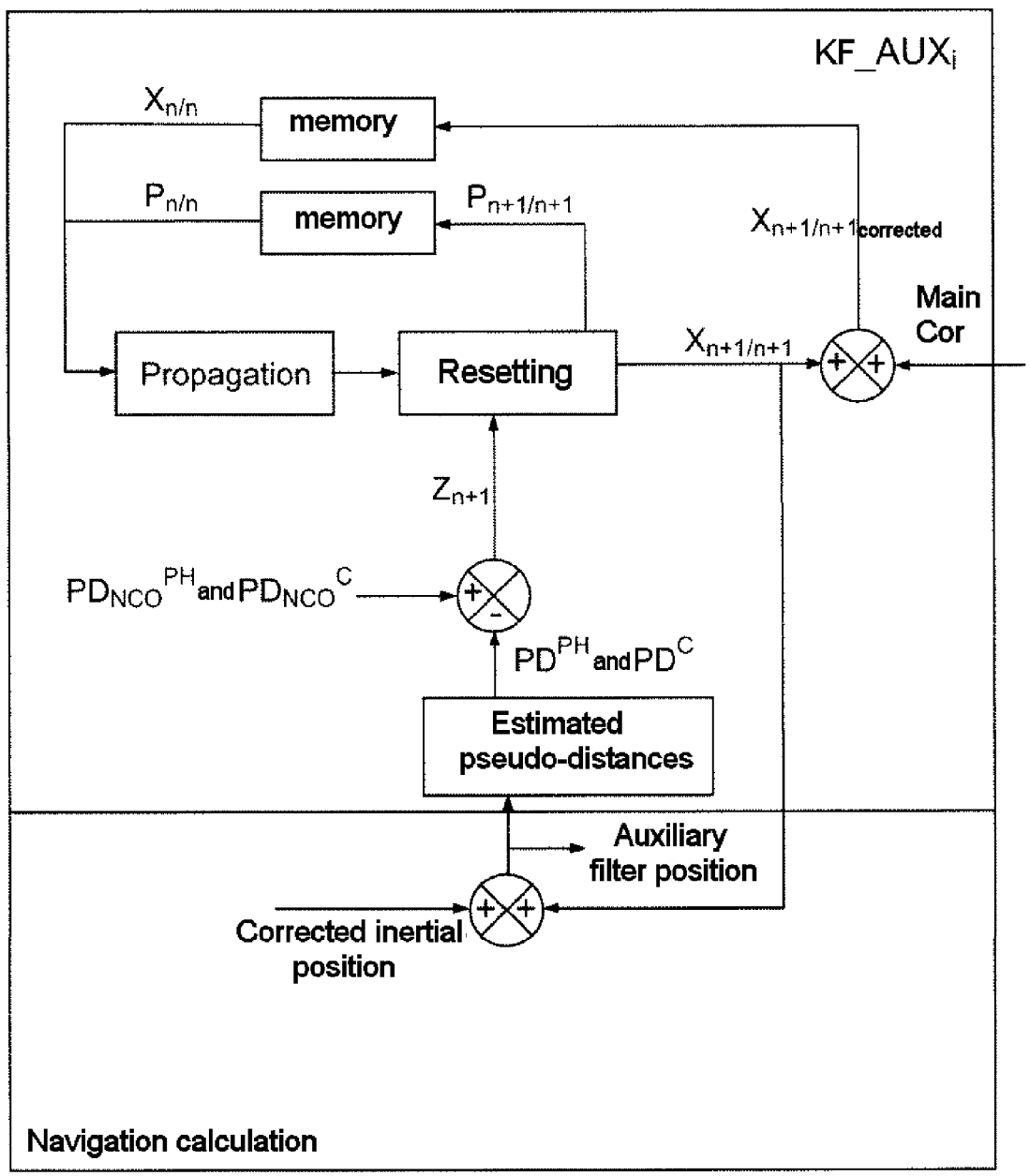
FIG. 17 illustrates an embodiment of an auxiliary filter for improving integrity in the case of closed-loop inertial coupling.

In this configuration, as illustrated in FIG. 17, navigation is done in relative mode, with respect to a beacon which dispatches its own dated carrier phase measurements. The principle of phase ambiguity resolution or RTK ("Real Time Kinematic") consists in resolving the ambiguities of the double differences of the measurements of phases for a positioning with respect to the beacon which is very precise, of the order of a millimetre. This conventional principle which requires a precise phase measurement is not generally used in jamming configurations on account of the low robustness of the phase loop in a conventional tracking scheme.

By virtue of the present invention, the precision navigation by phase ambiguity resolution RTK is extended to significant levels of interference. The beacon and the mobile receiver must both use the invention presented here.

Figure 18:
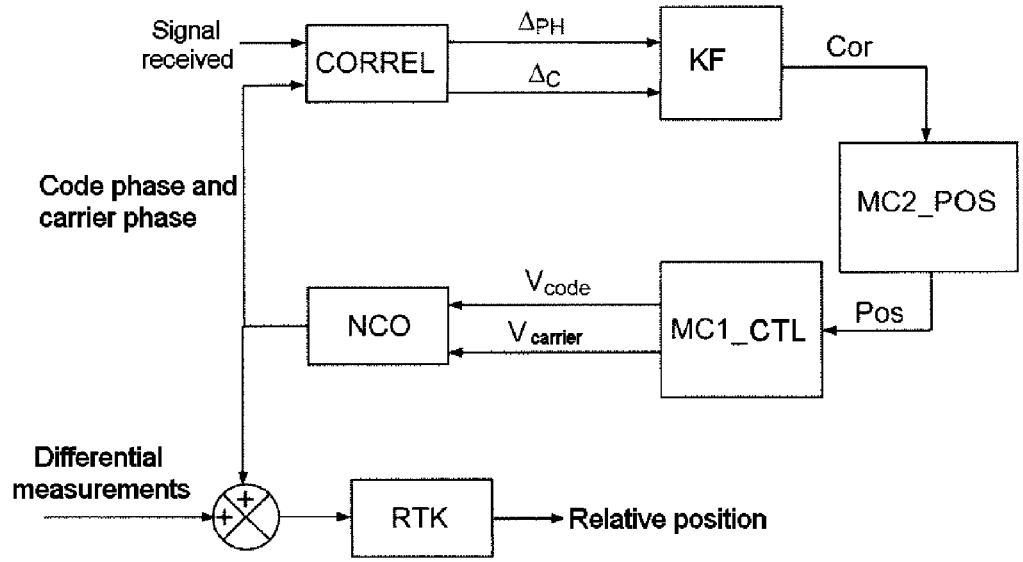
FIG. 18 illustrates a mode of achieving precision positioning with phase ambiguity resolution RTK, according to one embodiment.
Figure 19:
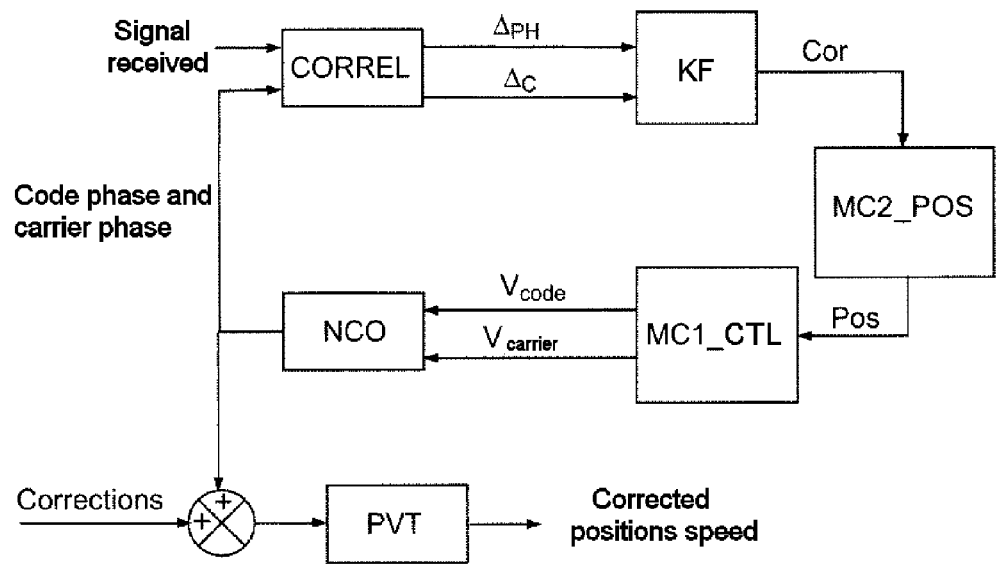
FIG. 19 illustrates a mode of achieving precision positioning with differential positioning with corrections.

It is also possible to use differential positioning with corrections, as illustrated in FIG. 18, for which a local beacon dispatches messages of corrections to be applied to the satellite pseudo-distances of the receiver to improve the precision of navigation. These corrections are applied to the phase pseudo-distance and code pseudo-distance in the PVT (position speed time) resolution.

To determine the attitude of a carrier, the combination of the measurements of phases of two receivers makes it possible to determine by ambiguity resolution the direction of the vector joining the antennas of the receivers. This process is then more robust to interference once the two receivers are equipped with the present invention.

The invention makes it possible to improve the precision of calculating the position and speed. Indeed, on account of the precision of the phase measurement, the calculation of the position and speed is less noisy and less multi-path sensitive.

The precision of the resetting of the inertia allows the identification of the defects of the inert in a finer manner and also in a faster manner. Indeed, for small movements, a conventional hybridization, in contradistinction to the hybridization according to the invention, is not precise enough to differentiate the dynamics and the natural noise of the GNSS measurements. Hence, when the vehicle re-enters a turn, for example, the precision of navigation will be maintained for the Kalman filter according to the invention, whereas the conventional filter risks diverging.

By virtue of the present invention, the applications requiring carrier phase measurement or being improved by the use of the carrier phase are then possible with much higher levels of jamming. The invention can then be put in place for applications which require a differential positioning calculation for precision approaches with the ability to land in poor weather, on difficult terrain (landing on deck, on a battlefield with hostile jamming, etc.), by day or by night, and which must be rapidly deployable and mobile for military, civilian and multinational applications, but also differential positioning of phase ambiguity resolution RTK type or the calculation of attitude which requires the resolution of the ambiguity of the carrier phase between two receivers.

The precision of the measurement automatically improves the integrity of the navigation solution.

What is claimed is:

1. A satellite-based positioning receiver, comprising:
    processing channels, each processing channel associated with a respective satellite from among a plurality of satellites; and
    an extended Kalman filter for performing a vector tracking for the set of satellites using signals received from the satellites, wherein
    the extended Kalman filter performs a propagation of an estimated state vector comprising a position error, and for implementing a matrix propagation equation involving a propagation matrix,
    each channel comprises a code generator, a phase generator, correlators with integrators, phase and code discriminators, a code phase numerically-controlled oscillator, and a carrier phase numerically-controlled oscillator,
    said extended Kalman filter performs a resetting on the basis of the phase error and code error received directly from the phase and code discriminators, of each channel,
    the receiver comprises first means for calculating the code-wise and carrier-wise control signals for said code phase and carrier phase numerically-controlled oscillators, on the basis of data provided by the said extended Kalman filter, for each channel, and the said extended Kalman filter is adapted for using, in the said matrix propagation equation, the state vector comprising a component representing the ambiguity of the measurement of the carrier pseudo-distance of each satellite, and a component representing an error related to the propagation of the signal in the ionosphere of each satellite.

2. The receiver according to claim 1, further comprising a second means for calculating an estimated position of the receiver in a terrestrial reference frame on the basis of a previously calculated position and of an error in this position.

3. The receiver according to claim 2, wherein said extended Kalman filter delivers as output, for the said second calculation means, estimated corrections of the position and speed of the receiver.

4. The receiver according to claim 1, further comprising at least one of:
   first means for slaving the code phase control at the output of the code phase numerically-controlled oscillator to the control signal at the input of the code phase numerically-controlled oscillator delivered by the said first calculation means; and
   second means for slaving the carrier phase control at the output of the carrier phase numerically-controlled oscillator to the control signal at the input of the phase numerically-controlled oscillator delivered by the said first calculation means.

5. The receiver according to claim 1, wherein said first calculation means calculates said code-wise and carrier-wise control signals by respective temporal differentiation of the said estimated code and phase pseudo-distances delivered by the said extended Kalman filter.

6. The receiver according to claim 1, wherein said first calculation means calculates said code-wise and carrier-wise control signals by respective finite expansion of the said estimated code and phase pseudo-distances delivered by the said extended Kalman filter.

7. The receiver according to claim 1, wherein said extended Kalman filter uses, in said matrix propagation equation, the state vector comprising a component comprising an error related to the propagation of the signal in the troposphere for each satellite.

8. The receiver according to claim 1, wherein each channel associated with a satellite comprises two sub-channels receiving from this satellite signals of different carrier frequencies, each sub-channel producing phase and code errors.

9. The receiver according to claim 2, further comprising an inertial centre delivering inertial data to at least one of said first control calculation means, said second position calculation means, and said extended Kalman filter.

10. The receiver according to claim 9, wherein said extended Kalman filter further delivers corrective signals for the said extended Kalman filter and said inertial centre.

11. The receiver according to claim 1, wherein said extended Kalman filter comprises:
   a main filter providing a position calculated in the terrestrial reference frame on the basis of the phase error and code error received directly from the phase and code discriminators of the satellites; and
   auxiliary Kalman filters of rank i, an auxiliary filter of rank i receiving the signals of the satellites of the plurality of satellites with the exception of a satellite of rank i.

12. The receiver according to claim 11, further comprising:
   third means for calculating a protection radius on the basis of the outputs of said Kalman filters; and
   means for verifying that this protection radius remains less than or equal to a threshold.

* * * * *